United States Patent
Balagopal et al.

(10) Patent No.: US 7,918,986 B2
(45) Date of Patent: *Apr. 5, 2011

(54) ELECTROLYTIC METHOD TO MAKE ALKALI ALCOHOLATES USING CERAMIC ION CONDUCTING SOLID MEMBRANES

(75) Inventors: Shekar Balagopal, Sandy, UT (US); Vinod K. Malhotra, Cedar City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/010,822

(22) Filed: Dec. 13, 2004

(65) Prior Publication Data

US 2005/0177008 A1    Aug. 11, 2005

Related U.S. Application Data

(60) Provisional application No. 60/528,612, filed on Dec. 11, 2003.

(51) Int. Cl.
*C25B 3/00*    (2006.01)
(52) U.S. Cl. ........ 205/450; 205/451; 205/452; 205/453; 205/454; 205/457
(58) Field of Classification Search .......... 205/450–454, 205/457
See application file for complete search history.

(56) References Cited

U.S. PATENT DOCUMENTS

| | | | |
|---|---|---|---|
| 3,197,392 A | 7/1965 | Silversmith et al. |
| 3,730,857 A | 5/1973 | Tripp |
| 3,964,983 A | 6/1976 | Eisenbach et al. |
| 4,217,184 A | 8/1980 | Kuck et al. |
| 4,250,000 A | 2/1981 | Kuck et al. |
| 4,857,665 A | 8/1989 | Hinrichs et al. |
| 4,990,413 A | 2/1991 | Lee et al. |
| 5,246,551 A | 9/1993 | Pletcher et al. |
| 5,286,354 A | 2/1994 | Bard et al. |
| 5,290,404 A | 3/1994 | Toomey |
| 5,290,405 A | 3/1994 | Joshi et al. |
| 5,389,211 A | 2/1995 | Sharifian et al. |
| 5,425,856 A | 6/1995 | Buckholtz et al. |
| 5,575,901 A | 11/1996 | Hulme et al. |
| 5,578,189 A | 11/1996 | Joshi |
| 5,580,430 A | 12/1996 | Balagopal et al. |

(Continued)

FOREIGN PATENT DOCUMENTS

DE    139528    1/1980

(Continued)

OTHER PUBLICATIONS

Young, "International Search Report for PCT/US07/00968 sent Oct. 1, 2007", 1-2.
Young, "Written Opinion for PCT/US07/00968 sent Oct. 1, 2007", 1-5.
Young, "International Search Report for PCT/US06/48746 sent Oct. 1, 2007", 1-2.
Young, "Written Opinion for PCT/US06/48746 sent Oct. 1, 2007", 1-4.
International Search Report from the corresponding PCT application PCT/US2004/041587 mailed Dec. 21, 2005.

(Continued)

*Primary Examiner* — Arun S Phasge
(74) *Attorney, Agent, or Firm* — David Fonda

(57) ABSTRACT

Disclosed are processes of making solutions of metal alcoholates in their corresponding alcohols using an electrolytic process. In a preferred embodiment, sodium methylate in methanol is made from methanol and sodium hydroxide solution. The sodium hydroxide solution is placed in the anolyte compartment and the methanol is placed in the catholyte compartment, and the two compartments are separated by a ceramic membrane that selectively transports sodium under the influence of current. In preferred embodiments, the process is cost-effective and not environmentally harmful.

29 Claims, 13 Drawing Sheets

U.S. PATENT DOCUMENTS

| | | | |
|---|---|---|---|
| 5,968,326 | A | 10/1999 | Yelon et al. |
| 5,985,388 | A | 11/1999 | Tomita et al. |
| 6,004,445 | A | 12/1999 | Genders et al. |
| 6,190,407 | B1 | 2/2001 | Ogle et al. |
| 6,221,225 | B1 | 4/2001 | Mani |
| 6,333,093 | B1 | 12/2001 | Burrell et al. |
| 6,398,938 | B2 | 6/2002 | Merk et al. |
| 6,573,205 | B1 | 6/2003 | Myers et al. |
| 6,770,187 | B1 | 8/2004 | Putter et al. |
| 6,805,787 | B2 | 10/2004 | Bess et al. |
| 2003/0106805 | A1* | 6/2003 | Horn .......................... 205/450 |
| 2005/0204612 | A1 | 9/2005 | Connemann et al. |
| 2005/0262760 | A1 | 12/2005 | Lawson et al. |
| 2006/0169594 | A1 | 8/2006 | Balagopal et al. |
| 2006/0226022 | A1 | 10/2006 | Balagopal et al. |
| 2007/0138020 | A1 | 6/2007 | Balagopal et al. |
| 2007/0158205 | A1 | 7/2007 | Balagopal et al. |
| 2008/0142373 | A1 | 6/2008 | Joshi et al. |
| 2008/0173540 | A1 | 7/2008 | Joshi et al. |
| 2008/0173551 | A1 | 7/2008 | Joshi et al. |
| 2008/0245671 | A1 | 10/2008 | Balagopal et al. |

FOREIGN PATENT DOCUMENTS

| | | |
|---|---|---|
| DE | 3346131 | 6/1985 |
| DE | 3702052 | 7/1988 |
| DE | 19603181 | 4/1997 |
| DE | 103 60 758 A1 | 7/2005 |
| EP | 0559400 | 9/1993 |
| EP | 0826794 | 3/1998 |
| GB | 1155927 | 6/1969 |
| HU | 37469 | 12/1985 |
| JP | 53011199 | 2/1978 |
| JP | 59067379 | 4/1984 |
| JP | 07196561 | 8/1995 |
| RO | 103535 | 6/1993 |
| WO | WO-9627697 | 9/1996 |
| WO | WO 03/014272 A3 | 2/2003 |

OTHER PUBLICATIONS

*Bipolar membranes: their properties and applications*, Strathmann, H., 1998, Clean and Efficient Processing : Electrochemical Technology for Synthesis, Separations, Recycle, and Environmental Improvement, International Forum, Electrolysis in the Chemical Industry, 12$^{th}$, Clearwater Beach, Fla., Oct. 11-15, 1998, 221-251; * Answer 3 of 9 on enclosed report (Abstract No. 1998:815810).

*Electrosynthesis of methanolates by membrane electrolysis*, Koter, S., Polish Journal of Chemistry (1997), 71(2), 232-243; * Answer 5 of 9 on enclosed report (Abstract No. 1997:153120).

*Electrodialysis in a non-aqueous medium: production of sodium methoxide*, Sridhar, S., Journal of Membrane Science (1996), 113(1), 73-9; * Answer 6 of 9 on enclosed report (Abstract No. 1996:251724).

*Transport and conversion processes in the direct electrochemical synthesis of alcoholates with Nafion membranes*, Hamann, Carl Heinz; Theile, Volker; Koter, Stanislaw; Chemie Ingenieur Technik (1992), 64(7), 648-9; * Answer 7 of 9 on enclosed report (Abstract No. 1992:559542.

*Ionic Conductivity in Na5YSi4O12 Type Silicates*, R.D. Shannon, et al., Inorganic Chemistry, vol. 17, No. 4 (1978), 958-964.

*Ceramic Cleansers; Environmental Uses of Sodium Super-Ionic Conducting Ceramics*, Davor Sutija, et al., The Electrochemical Society Interface, Winter 1996, vol. 5, No. 4, pp. 26-30.

*Selective Sodium Removal From Aqueous Waste Streams with NaSICON Ceramics*, S. Balagopal, et al., Separation and Purification Technology 15 (1999) 231-237.

Stoichiometry-Structure-Fast Ion Conduction in the NaSICON Solid Solution, J.P. Biolot, Ph. Colobman, et al., Solid State Ionics 28-30 (1988) 403-410, North-Holland, Amsterdam.

*Fast Na+ —Ion Transport in Skeleton Structures*, J.B. Goodenough, et al., Mat. Res. Bull. vol. 11, pp. 203-220, 1976. Pergamon Press, Inc. Printed in the United States.

*Crystal Structures and Crystal Chemistry in the System Na1+xZr2SixP3-xO12*, H.Y-P. Hong, Mat. Res. Bull. vol. 11, pp. 173-186, 1976. Pergamon Press, Inc. Printed in the United States.

Young, International Search Report for PCT/US07/25541 sent Mar. 17, 2008, 1-2.

Young, Written Opinion for PCT/US07/25541 sent Mar. 17, 2008, 1-6.

Alamo, J. "Chemistry and properties of solids with the [NZP] skeleton", *Solid State Ionics*, vol. 63-65, (1993), 547-561.

Bentzen, J. J., et al., "The preparation and characterization of dense, highly conductive $Na_5 GdSi_4 O_{12}$ nasicon (NGS)", *Materials Research Bulletin*, vol. 15, (1980), 1737-1745.

Delmas, C. et al., "Crystal chemistry of the $Na_{1+x}Zr_{2-x}L_x(PO_4)_3$ (L = Cr, In, Yb) solid solutions", *Materials Research Bulletin*, vol. 16, (1981), 285-290.

Desbois, V. "Written Opinion of the International Searching Authority from PCT application PCT/US/2004/041587", (Dec. 21, 2005), 1-9.

Fujitsu, S. et al., "Conduction paths in sintered ionic conductive material $Na_{1+x}Y_xZr_{2-x}(PO_4)_3$", *Materials Research Bulletin*, vol. 16, (1981), 1299-1309.

Miyajima, Y. et al., "Ionic conductivity of NASICON-type $Na_{1+x}M_xZr_{2-x}P_3O_{12}$(M: Yb, Er, Dy)", *Solid State Ionics*, vol. 84, (1996), 61-64.

Saito, Y. et al., "Ionic Conductivity of NASICON-type conductors $Na_{1.5}M_{0.5}Zr_{1.5}(PO_4)_3$ (M: $Al^{3+}$, $Ga^{3+}$, $Cr^{3+}$, $Sc^{3+}$, $Fe^{3+}$, $In^{3+}$, $Yb^{3+}$, $Y^{3+}$)", *Solid State Ionics*, vol. 58, (1992), 327-331.

Shimazu, K. et al., "Electrical conductivity and $Ti^{4+}$ion substitution range in NASICON system", *Solid State Ionics*, vol. 79, (1995), 106-110.

Van Gerpen, J. et al., "Biodiesel Production Technology", *National Renewable Energy Laboratory, NREL/SR-510-36244*, (Jul. 2004), 1-110.

Von Alpen, V. et al., "Compositional dependence of the electrochemical and structural parameters in the NASICON system $(Na_{1+x}Si_xZr_2P_{3-x}O_{12})$", *Solid State Ionics*, vol. 3/4. (1981), 215-128.

Horn, Michael Abstract of DE10246375, DE10246375, (May 15, 2003), 1.

Kuhn, Amselm T., et al., Abstract of GB1155927, (Jun. 25, 1969), 1-2.

Lehmann, Thomas et al., Abstract of DE10360758, DE10360758, (Jul. 28, 2005), 1-2.

Oku, Toshio et al., Abstract of JP53011199, JP53011199, (Feb. 1, 1978), 1.

Rooney, K. Abstract and International Search Report for WO03014272, (Nov. 2, 2003) 1-6.

Satou, Hiroshi et al., Abstract of JP59067379, JP59067379, (Apr. 17, 1984), 1.

Young, Lee W., "International Search Report", (Jul. 7, 2008),1-2.

Young, Lee W., "Written Opinion of the International Searching Authority", (Jul. 7, 2008),1-5.

Young, Lee W., "International Search Report", (Dec. 18, 2008),1-2.

Young, Lee W., "Written Opinion of the International Searching Authority", (Dec. 18, 2008),1-5.

Young, Lee W., "International Search Report", (Apr. 24, 2009),1-3.

Young, Lee W., "Written Opinion of the International Searching Authority", (Apr. 24, 2009),1-5.

Phasge, Arun S., "Office Action for U.S. Appl. No. 11/449,953", (Apr. 7, 2009),1-9.

Phasge, Arun S., "Office Action for U.S. Appl. No. 11/396,057", (Oct. 10, 2008),1-8.

Phasge, Arun "Final Office Action for U.S. Appl. No. 11/449,953", (Nov. 17, 2009).

Phasge, Arun "Final Office Action for U.S. Appl. No. 11/396,057", (Jul. 23, 2009).

Phasge, Arun "Non-Final Office Action for U.S. Appl. No. 11/396,057", (Dec. 24, 2009).

Gregg, Nicholas "European Search Report", *European Application No. 06847897.3*, PCT App. No. PCT/US2006048746,(Sep. 16, 2009),1-4.

* cited by examiner

Anode: $2OH^- \rightarrow 1/2\ O_2 + H_2O + 2e^-$
Cathode: $2CH_3OH + 2e^- + 2Na^+ \rightarrow 2NaCH_3O + H_2$
Overall: $2CH_3OH + 2NaOH \rightarrow 2NaOCH_3 + H_2 + 1/2O_2 + H_2O$

ELECTROLYTIC METHOD TO MAKE ALKALI ALCOHOLATES USING CERAMIC ION CONDUCTING SOLID MEMBRANES

RELATED APPLICATION INFORMATION

This application claims priority under 35 U.S.C. §119(e) to U.S. Provisional Patent Application No. 60/528,612, filed Dec. 11, 2003.

BACKGROUND OF THE INVENTION

1. Field of the Invention

This invention relates to electrochemical production of alkali alcoholates from alkali metal salt solutions and alcohol by using an ion conducting ceramic solid electrolyte or membrane based electrochemical cell. In preferred embodiments, it includes making sodium methylate (i.e. sodium methoxide) in an electrolytic cell using ceramic membranes. In preferred embodiments, the process includes the use of sodium-ion conducting ceramic membranes.

2. Description of the Related Art

There are two primary methods of making sodium methylate, also called sodium methoxide that are in current use. The first is a sodium-based process in which sodium metal is reacted with methanol to produce sodium methylate. This method uses sodium metal as a raw material, which is expensive and it reacts violently with lower alcohols and the process can be extremely difficult to control. Sodium metal also reacts violently with water requiring elaborate and expensive equipments and systems for storage, handling, and delivery of sodium metal.

In a second process, sodium methylate is made from sodium amalgam produced from the chlor alkali electrolysis in a mercury cell by reacting with the amalgam with alcohol. The drawback of this process is it can result in the contamination of the product and the environment with mercury, a well known carcinogen. For this reason, use of sodium methylate produced by this method will likely be unattractive for agriculture, pharmaceuticals, and bio-diesel applications.

In certain electrolytic systems for use in producing alkali alcoholates from salt solutions, various materials have been suggested for use as an ion-conducting membrane positioned between the anolyte and catholyte chambers for transportation of ions there through. Such materials include ceramic materials alone, polymeric materials, and combinations of ceramic and polymeric materials The known advantage of polymeric materials as electrolytes in the electrolysis of salt solutions is their high conductivity and increased high resistance to acidic and caustic environments resulting from the electrolytic process. The known disadvantage of polymers, however, is their low selectivity for ionic species; that is, along with the desired alkali metal ions, polymers transport unwanted protons & cations and also cause the electroosmotic transport of water, the result of which is an inefficient operation of the electrolytic cell.

Use of materials such as $\beta^I$ and $\beta^{II}$-Alumina membranes reported by Horn (U.S. Patent Application Publication No. 2003/0106805) for synthesis of alkali alcoholates show low sodium ion conductivity at temperatures below 100° C., the temperature range most practical for aqueous electrochemical applications. In Horn's patent application, the electrochemical performance of the cell decays or degrades with time due to the degradation of the conducting structure of membrane, which limits ionic conductivity in $\beta^I$ and $\beta^{II}$-alumina electrolyte at temperatures below 100° C. A considerable increase in voltage of the cell was reported in Horn's application where the cell performance degraded after 4 hours of operation. The current density decreased from 40.8 $A/m^2$ to 7.5 $A/m^2$ during this period in one of the tests. Such a low current density, 0.75 $mA/cm^2$ for his cell, would require an extremely large number of cells for a commercial operation, making it impractical to commercialize the technology based on $\beta^I$ and $\beta^{II}$-alumina membranes. The complexity of processing $\beta^I$ and $\beta^{II}$-alumina materials and their high manufacturing cost, aided with stability issues in aqueous salts precursors makes the $\beta^I$ and $\beta^{II}$-alumina less practical for this intended application. Horn reports the application of an ion permeable layer deposited by vapor depositions method on the solid electrolyte, to limit the solid electrolyte from reacting with the aqueous anolyte solutions Data reported in the Horn application refers to back-migration of methanol into the anolyte solution, causing its contamination and adversely impacting its eventual disposal. There is no reported data in the Horn application that shows sodium methylate of 25 wt. % concentration or above could be produced by his cell.

SUMMARY OF THE INVENTION

In view of the known methods, a method of making sodium methylate and other alkali alcoholates that is simple, safe, environmentally benign, and cost-effective, preferably one which is also environmentally responsible, is needed.

In accordance with a preferred embodiment, there is provided a method of making alkali alcoholates, preferably sodium methylate. The method comprises feeding an alcohol, preferably methanol, into a catholyte compartment of an electrolytic cell, feeding an alkali metal salt solution, preferably sodium hydroxide, into an anolyte compartment of the cell, and applying potential across the electrodes of the cell. The anolyte compartment and the catholyte compartment of the cell are separated by a ceramic membrane that, upon application of the electric current, selectively transports the alkali metal cations, preferably sodium cations, from the anolyte compartment to the catholyte compartment. In preferred embodiments, the membrane is substantially impermeable to water, operates at a high current density, and/or operates at a low voltage. The metal cations, following their transport across the membrane, react with the alcoholate to form a metal alcoholate solution, preferably sodium methylate in methanol, in the catholyte compartment of the cell.

In accordance with one embodiment, there is provided a method for producing sodium methylate solution. The method comprises feeding a catholyte solution comprising methanol into a catholyte compartment of an electrolytic cell, feeding an anolyte solution comprising one or more sodium salts in aqueous solution into an anolyte compartment of the cell, and applying an electric potential across the cell, whereby the sodium ions migrate across the membrane and then react with the methoxide solution in the catholyte compartment of the cell to form sodium methylate. In preferred embodiments, the anolyte compartment and the catholyte compartment are separated by a ceramic membrane that, upon application of the electric potential across the cell, selectively transports sodium cations from the anolyte compartment to the catholyte compartment. The membrane is preferably substantially impermeable to water and/or does not suffer degraded performance when in contact with water.

In accordance with one embodiment, an electrolytic cell for producing sodium methylate solution is provided. The cell comprises a catholyte compartment containing a cathode and a solution comprising methanol or a dilute solution of sodium methylate, an anolyte compartment containing an anode and a solution comprising one or more sodium based salt, and a cation-selective ceramic membrane separating the anolyte compartment and the catholyte compartment that selectively permits the flow of sodium cations from the anolyte compartment to the catholyte compartment upon application of a voltage across the cell. Certain preferred embodiments have one or more of the following features: the membrane is substantially impermeable to water; the membrane maintains a constant current density for at least during 6 hours of the operation, preferably for the entire duration of the operation; and/or the cell operates at a current density of at least about 100 mA/cm$^2$.

The specific embodiments above may be adapted to other alkali metal cations and other alcohols, for the full scope of the invention disclosed herein, as will be readily apparent to those skilled in the art.

DETAILED DESCRIPTION OF THE PREFERRED EMBODIMENT

The following description illustrates preferred embodiments of the present invention in detail. Those of skill in the art will recognize that there are variations and modifications of the embodiments described herein that are encompassed by the scope of the invention. Accordingly, the description of preferred embodiments should not be deemed to limit the scope of the invention.

Disclosed herein are processes for the production of non-aqueous alkali alcoholates by electrolysis of an aqueous alkali metal salt solution. In preferred embodiments, the process includes the use of sodium ion conducting ceramic membranes. In one embodiment, the method is an electrolytic process to make sodium methylate in methanol from methanol and sodium hydroxide solution or from a dilute solution of sodium methylate in methanol and sodium hydroxide solution. The process described herein may also be used to make other alkali alcoholates in the corresponding alcohol from alcohol and aqueous alkali metal salt solutions, preferably where the alkyl group is a lower alkyl.

Figure 1:
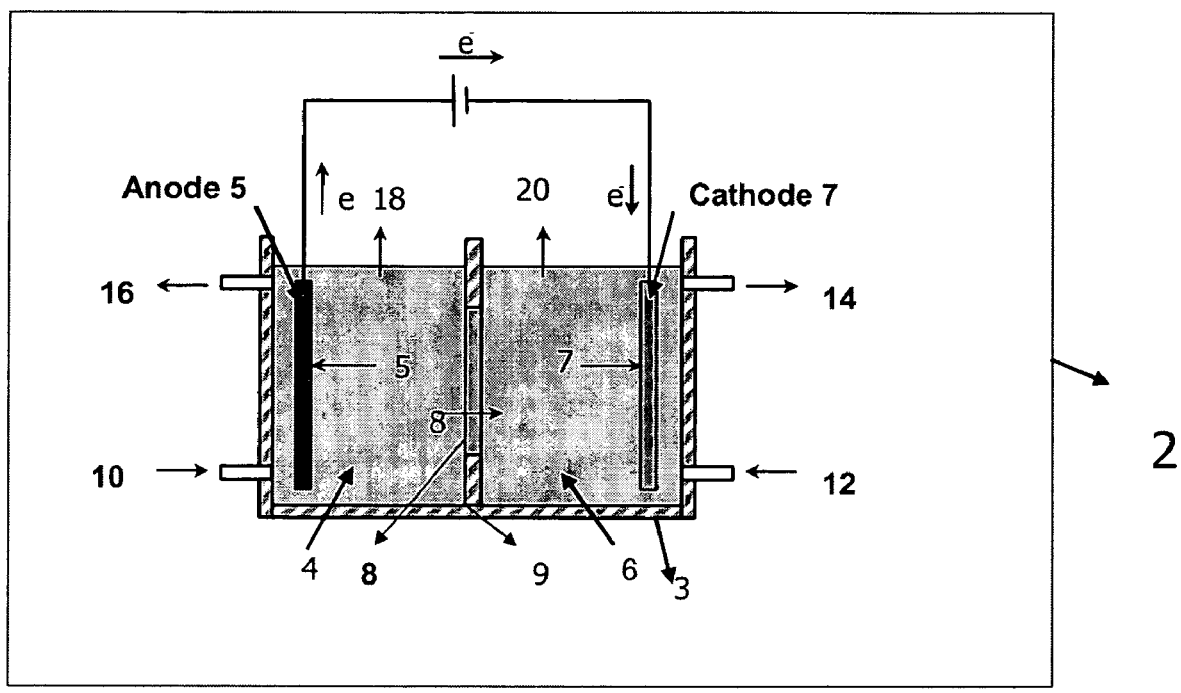
FIG. 1 is a schematic representation of an electrolytic cell according to a preferred embodiment.

Referring to FIG. 1, there is provided a schematic representation of an electrolytic cell 2 that can be used in the processes described herein. In a preferred embodiment, the cell is used to make sodium methylate. The cell 2 comprises a container or shell 3, which is preferably corrosion resistant, a catholyte chamber 6, an anolyte chamber 4, an anode 5, a cathode 7, and an ion-conducting electrolyte or membrane 8, which may be positioned in a scaffold or holder 9. The container 3, and other parts of the cell 2, may be made of any suitable material, including metal, glass, plastics, composite, ceramic, other materials, or combinations of the foregoing. The material that forms any portion of the cell 2 is preferably not reactive with or substantially degraded by the chemicals and conditions that it is exposed to as part of the process.

The cell 2 further comprises an anolyte inlet 10 for introducing chemicals into the 4, an anolyte, outlet 16 for removing anolyte solution from the anolyte chamber 4, a catholyte inlet 12 for introducing chemicals into the catholyte chamber 6, and a catholyte outlet 14 for removing catholyte solution from the catholyte chamber 6. Because gases may be evolved from the cell during operation, venting means (18, 20) are provided to vent, treat and/or collect gases from the anolyte chamber 4 and/or catholyte chamber 6. The means may be a simple venting system such as openings, pores or holes in the upper portion of the container 3, and/or a collection tube, hose, or conduit in fluid communication with an airspace or gap above the fluid level in the anolyte and/or catholyte chambers. The gases which are evolved may be collected, vented to outside the cell, sent through a scrubber or other treatment, or treated in any other suitable manner.

The electrode materials are preferably good electrical conductors and should be stable in the media to which they are exposed. Any suitable material may be used, and the material may be solid or plated, or perforated or expanded. One suitable electrode material is a dimensionally stable anode (DSA) which is comprised of ruthenium oxide coated titanium ($RuO_2$/Ti). Good anodes can also be formed from nickel, cobalt, nickel tungstate, nickel titanate, platinum and other noble anode metals, as solids plated on a substrate, such as platinum-plated titanium. Stainless steel, lead, graphite, tungsten carbide and titanium diboride are also useful anode materials. Good cathodes can be formed from metals such as nickel, cobalt, platinum, silver and the like and alloys such as titanium carbide with small amounts (preferably only up to about 3%) of nickel, $FeAl_3$, $NiAl_3$, stainless steel, perovskite ceramics, and the like. Graphite is also a good cathode material. In a preferred embodiment, the electrodes are chosen to maximize cost efficiency effectiveness, by balancing electrical efficiency with low cost of electrodes.

In one embodiment, the cell may be operated in a continuous mode. In a continuous mode, the cell is initially filled with anolyte and catholyte solutions and then, during operation, additional solutions are fed into the cell through the inlets 10, 12 and products, by-products, and/or diluted solutions are removed from the cell through the outlets 14, 16 and/or the venting means 18, 20 without ceasing operation of the cell. The feeding of the reactants anolyte and catholyte solutions may be done continuously or it may be done intermittently, meaning that the flow of a given solution is initiated or stopped according to the need for the solution and/or to maintain desired concentrations of solutions in the cell, without emptying one or both compartments. Similarly, the removal of solutions from the anolyte compartment and the catholyte compartment may also be continuous or intermittent. Control of the addition and/or removal of solutions from the cell may be done by any suitable means. Such means include manual operation, such as by one or more human operators, and automated operation, such as by using sensors, electronic valves, laboratory robots, etc. operating under computer or analog control. In automated operation, a valve or stopcock may be opened or closed according to a signal received from a computer or electronic controller on the basis of a timer, the output of a sensor, or other means. Examples of automated systems are well known in the art. Some combination of manual and automated operation may also be used. Alternatively, the amount of each solution that is to be added or removed per unit time to maintain a steady state may be experimentally determined for a given cell, and the flow of solutions into and out of the system set accordingly to achieve the steady state flow conditions.

In another embodiment, the system is operated in batch mode. In batch mode, the anolyte and catholyte solutions are fed into the cell and the cell is operated until the desired concentration of product is produced at the catholyte. The cell is then emptied, the product collected, and the cell refilled to start the process again. Alternatively, combinations of continuous mode and batch mode production may be used. Also, in either mode, the feeding of solutions may be done using a pre-prepared solution or using components that form the solution in situ.

Flow rate refers to the recycle anolyte and catholyte solutions and not to the in-coming or out-going solutions. It should be noted that both continuous and batch mode have dynamic flow of solutions. In continuous mode, the anolyte make up solution is added so the sodium concentration is maintained at a certain concentration. In a batch mode, a certain quantity of sodium salt is used and sodium loss in the anolyte due to its transfer through the membrane to the catholyte in not replenished. The operation is stopped when the Na concentration in the anolyte reduces to a certain amount or when the appropriate sodium methylate concentration is reached in the catholyte.

It is preferred that only electrolytic reactions occur in the cell and that galvanic reactions be eliminated or, at least, greatly minimized. Preferred ion conducting membranes include those which eliminate or minimize galvanic reactions and promote only electrolytic reactions and have one or more of the following characteristics: (1) high ionic conductivity with minimum, preferably negligible, electronic conductivity; (2) high selectivity to preferred ionic species; (3) physical separation (dense ceramic electrolyte) of the anolyte from the catholyte The membrane 8 selectively transports a particular, desired cation species from the anolyte to the catholyte side even in the presence of other cation species. The membrane is also significantly or essentially impermeable to water and/or other undesired metal cations. In preferred embodiments, the membrane preferably has a current density from about 0.5 to about 1 amp/in$^2$, including about 0.6, 0.7, 0.8, and 0.9 amp/in$^2$.

In accordance with preferred embodiments, ceramic NaSICON (Sodium Super Ionic Conductors) membrane compositions from Ceramatec, Inc. have comprehensive characteristics of high ion-conductivity for alkali metal ions at low temperatures, high selectivity for alkali metal ions, excellent current efficiency and chemical stability in water, ionic solvents, and corrosive alkali media under static and electrochemical conditions are provided. Such membranes have one or more, or all, of the following desirable characteristics which make them suitable for aqueous and non-aqueous electrochemical applications. One characteristic is that, being dense, the membrane is impervious to water transport, and is not influenced by scaling or precipitation of divalent ions, trivalent ions, and tetravalent ions or dissolved solids present in the solutions. Two other characteristics are that the membrane does not degrade in the presence of corrosive elements and the membrane can be operated in a wide pH range (2 to 14). Another beneficial characteristic of the membrane is that it selectively transports sodium ions in the presence of other ions at transfer efficiency above 95%. Yet another characteristic is that the membrane provides the added benefits of resistance to fouling by precipitants, and/or electro-osmotic transport of water, which is common with organic or polymer membranes. Suitable membranes may also or instead have other characteristics mentioned elsewhere herein.

The advantage of certain ceramic materials is their good ion-conducting characteristics and selectivity under certain conditions. Preferred stiochiometric and non-stiochiometric NaSICON type (sodium super ion conductor) materials, such as those having the formula for example $M^1M^2A(BO_4)_3$ where $M^1$ and $M^2$ are independently chosen from Li, Na, and K, and where A and B include metals and main group elements, analogs of NaSICON have an advantage over beta alumina and other sodium ion-conductors. The multi-oxide NaSICON membrane compositions are comparatively stable in water while beta alumina instead hydrates and becomes unstable in aqueous solution. Furthermore, the NaSICON materials are better sodium ion conductors than beta alumina at temperatures below 200° C., below 100° C. and at room temperature.

The preferred membranes and methods described herein provide cells which are more efficient than those described in U.S. Patent Application Publication No. 2003/0106805 to Horn. The low current density for Horn's cell, 0.75 mA/cm$^2$ vs. over 100 mA/cm$^2$, including over 200 mA/cm$^2$ for cells according to certain preferred embodiments of cells of the present disclosure, would require an extremely large number of cells for a commercial operation, making it impractical to commercialize the technology of the Horn application based on $\beta^I$ and $\beta^{II}$-alumina. Furthermore, unlike Horn's cell, which experienced a drop in current density from 40.8 A/m$^2$ to 7.5 A/m$^2$ following 4 hours of operation, cells according to preferred embodiments hereunder are capable of maintaining a constant current density (variance by 10% or less) for at least 4 hours of operation.

Preferred ceramic membranes are essentially impermeable to at least the solvent components of both the catholyte and anolyte solution. One advantage of these ceramic electrolyte membranes is their low or even negligible electronic conductivity, which virtually eliminates any galvanic reactions from occurring when an applied potential or current is removed from the cell containing the membrane. NaSICON membranes typically are very selective to a specific ion and hence have a high transference number of preferred species, implying very low efficiency loss due to near zero electro-osmotic transport of water molecules. Polymeric membranes generally have low transference number of preferred species and, have low transfer efficiency.

As noted above, in a preferred embodiment, the cation conducted by the membrane is the sodium ion (Na$^+$). Preferred sodium ion conducting ceramic membranes include series of NaSICON membrane compositions (Ceramatec, Inc. coded: NAS-D, NAS-E, NAS-G, NAS-H, NAS-F, etc.) and membrane types in U.S. Pat. No. 5,580,430, hereby incorporated by reference in its entirety from Ceramatec, Inc. (Salt Lake City, Utah). Analogs of NaSICON to transport ions such as Li and K, to produce other alkali alcoholates are also developed at Ceramatec, Inc. These ion conducting NaSICON membranes are particularly useful in electrolytic systems for simultaneous production of alkali alcoholates, by electrolysis of an alkali (e.g., sodium) salt solutions. In preferred methods, a solid sodium ion exchange based ceramic membrane is separated by two compartments of a cell. The sodium ions transfer across the membrane from the anolyte to the catholyte chamber under the influence of electrical potential to generate sodium alcoholates. Preferred ion specific membranes do not allow transport of water there through, which is useful in making the water sensitive alkali alcoholates. Furthermore, these membranes have low electronic conductivity, superior corrosion resistance, and high flux of specific alkali ions providing, high ionic conductivity.

While the ceramic materials disclosed herein encompass or include many formulations of NaSICON materials, this disclosure concentrates on an examination of NaSICON-type materials for the sake of simplicity. The focused discussion of NaSICON-type materials as one example of materials is not, however, intended to limit the scope of the invention. For example, the materials disclosed herein as being highly conductive and having high selectivity include those metal super ion conducting materials that are capable of transporting or conducting any alkali cation, such as sodium (Na), lithium (Li), potassium (K), ions for producing alkali alcoholates.

Figure 2:
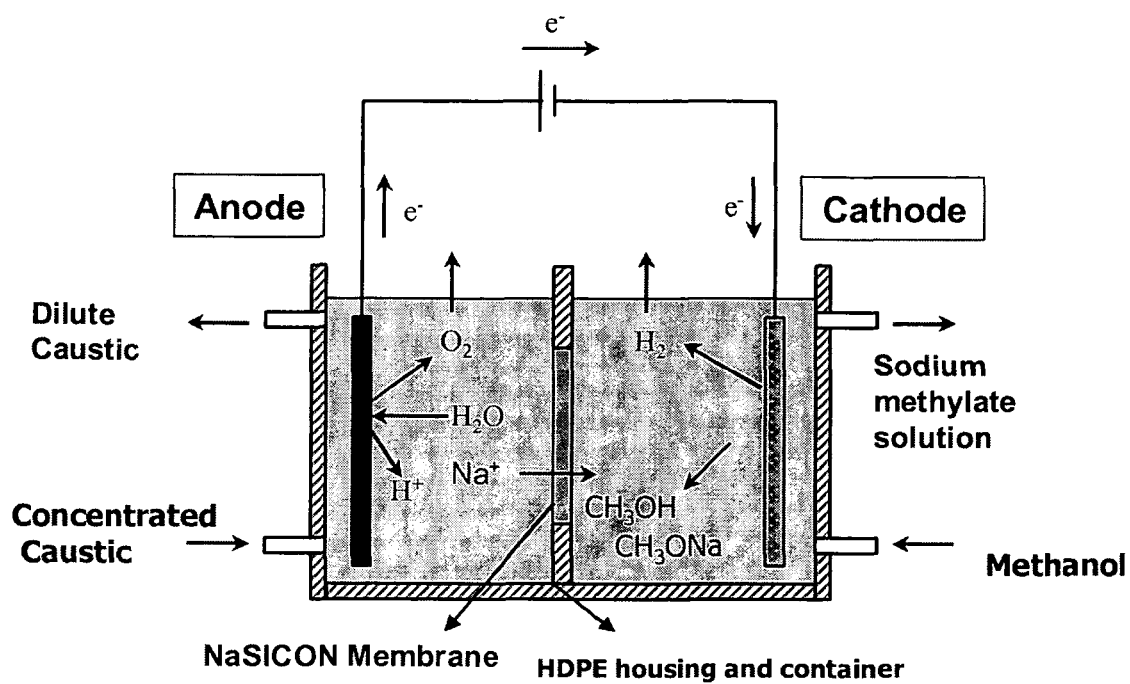
FIG. 2 is a schematic representation of an electrolytic cell with a flat plate sodium ion conducting membrane as is used to make sodium methoxide according to a preferred embodiment. Also shown are the half-cell reactions for producing sodium methoxide by the electrochemical process using a sodium membrane based electrolytic cell.

Membranes of NaSICON types may be formed by ceramic processing methods such as those known in the art. Such membranes may be in the form of very thin sheets supported on porous ceramic substrates, or in the form of thicker sheets (plates) or tubes. A cell employing NaSICON flat circular disc is illustrated in FIG. 2. where concentrated sodium methylate is formed in the catholyte chamber.

The ceramic materials disclosed herein are particularly suitable for use in the electrolysis of alkali metal salt solutions because they have high ion-conductivity for alkali metal cations at low temperatures, high selectivity for alkali metal cations, good current efficiency and stability in water and corrosive media under static and electrochemical conditions. Comparatively, beta alumina is a ceramic material with high ion conductivity at temperatures above 300° C. but has low conductivity at temperatures below 100° C., making it less practical for applications below 100° C. Preferred ceramic materials, such as NaSICON-type materials, have several orders higher sodium ion conductivity in comparison to beta alumina at temperatures below 100° C., and have comparatively better stability in water.

Preferred ceramic-based alkali metal cation conducting membranes include one or more of the following features and use characteristics: solid; high alkali ion conductivity at temperatures below 100° C.; high selectivity for particular alkali cations (e.g. $Na^+$); sodium transfer efficiency greater than 90%; stability in organic or inorganic sodium salts and chemicals; density greater than 95% of theoretical generally impervious to $H_2O$ transport, electronically insulating; and resistant to acid, alkaline, caustic and/or corrosive chemicals.

Na-ionic conductivity in NaSICON structure has an Arrhenius dependency on temperature, generally increases as a function of temperature. The sodium ion conductivity of NAS-G composition, ranges from $3\times10^{-2}$ S/cm to $8\times10^{-2}$ S/cm from room temperature to 85° C.

NaSICON-type materials, especially of the type described herein, have low or negligible electronic conductivity, and as such aid in virtually eliminating the occurrence of any galvanic reactions when the applied potential or current is removed. Preferred NASICON analogs have very mobile cations, including, but not limited to lithium, sodium, and potassium ions, that provide high ionic conductivity, low electronic conductivity and comparatively high corrosion resistance.

The cation conductive ceramic materials referred herein for use in electrolytic cells can be used successfully in the formation of alkali alcoholates from the electrolysis of aqueous sodium salt solutions, including, but not limited to, such solutions as sodium carbonate, sodium nitrate, sodium phosphate, sodium hypochlorite, sodium chloride, sodium perchlorate, and sodium organic salts. The ceramic membrane compositions evaluated herein are equally applicable for use in sodium based acidic, alkaline, and caustic solutions.

An ideal solid electrolyte is an electronic insulator and an excellent ionic conductor. The $NaM_2(BO_4)_3$ is the best known member of a large family of sodium conducting compounds and crystalline solutions that have been extensively studied. The structure has hexagonal arrangement and remains stable through a wide variation in atomic parameters as well in the number of extra occupancies or vacancies. In $NaM_2(BO_4)_3$ all the sodium atoms are at one of the inequivalent positions available for sodium ion and therefore show poor sodium ion conductivity ($8.71\times10^{-7}$ S/cm at 90° C.). The low ionic conductivity at temperatures below 100° C. of NaSICON type compositions reported in scientific literature (J. B. Goodenough, H. Y. Hong, and J. A. Kafalas, Materials Res. Bull), is attributed to the fact that pure mono phase compositions, free of secondary phase, which precipitates as an impurity, cannot be prepared. Researchers have shown that the ionic conductivity of NaSICON type compositions is clearly equivalent to those of $\beta''$-Alumina, at 300° C., (H. Y. Hong, Materials Res. Bull. 11(1976), 173; 11(1976) 203; J. P. Boilet, P. H. Colomban, Solid State Ionics 28-30 (1988) 403-410.) The low conductivity in NaSICON compounds reported in literature below 300° C. is attributed to the presence of low conducting phase that is produced as a secondary phase. Ceramatec, Inc. phase pure compositions have conductivity in the range of 10-2 S/cm approaching 10-2 S/cm from room temperature to 90° C.

Preferred ceramic membranes include the ceramic NaSICON type membranes include those having the formula $NaM_2(BO_4)_3$ and those having the formula $M^1M^2A(BO_4)_3$, but also including compositions of stiochiometric substitutions where $M^1$ and $M^2$ are independently chosen to form alkali analogs of NaSICON. Substitution at different structural sites in the above formula at $M^1M^2$, A, and B may be filled by the 2+, 3+, 4+, 5+ valency elements. Other suitable alkali ion conductor ceramic materials have the formula: $M_{1+x}A_{2-x}N_yB_xC_{3-x}O_{12}$ ($0<x<2$) ($0<y<2$), where $M^1M^2$=Li, Na, K, and non-stiochiometric compositions, in the above formulation with substitution at different structural sites in the above formula $M^1$, $M^2$, A, N, B and C by the 2+, 3+, 4+, 5+ valency elements.

The processing of $Na_3Zr_2Si_2PO_{12}$ and $Na_5RESi_4O_{12}$ type NaSICON compositions (where RE is either Yttrium or a rare earth element) proceed as follows. Through an extensively designed approach, the second generation (NAS-D, NAS-E, NAS-G, NAS-H, etc.) membranes are systematically synthesized by solid-state oxide mixing technique. Mixture of the starting precursors are mixed in methanol in polyethylene jars. The mixed precursor oxides are dried at 60° C. to evolve the solvent. The dried powder or material is calcined at 800° C., to form the required composition. The calcined material is wet ball milled with zirconium oxide media (or other metal media) to achieve the prerequisite particle size distribution. Green membranes at 0.60 to 2.5 inch diameter sizes are pressed by compaction in a die and punch assembly and then sintered in air at temperatures between 1100° C. and 1200° C. to make dense ceramic oxides. XRD analysis of NASICON composition is performed to identify the crystal structure and phase purity. The NAS D through NAS F compositions are stiochiometric and non stiochiometric compositions of $Na_3Zr_2Si_2PO_{12}$ type formula. Non Stiochiometric means unequivalent substitution of Zr, Si, and/or P in the formula. The NAS-D has Ti, NAS-E has Sn, and NAS-G has Hf partial substitution at the Zr site. In the NAS-F, and NAS-H compositions there is partial substitution of Ti, Sn, and Ge at the Zr, Si, and P sites. Examples of compositions and processing for NaSICON include the following: S. Balagopal, T. Landro, S. Zecevic, D. Sutija, S. Elangovan, and A. Khandkar, "Selective sodium removal from aqueous waste streams with NaSICON ceramics", *Separation and Purification Technology* 15 (1999) 231-237; Davor Sutija, Shekar Balagopal, Thom Landro, John Gordon, "Ceramic Cleansers, Environmental applications of Sodium Super-Ionic Conducting Ceramics", The Electrochemical *Soc. Interface.* 5 (4) (1996) 26; R. D. Shannon, B. E. Taylor, T. E. Gier, H. Y. Chen, T. Berzins, Ionic Conductivity in $Na_5YSi_4O_{12}$ type silicates, Inorg. Chem. 17 (4) (1978) 958; S. H. Balagopal, J. H. Gordon, A. V. Virkar, A. V. Joshi, U.S. Pat. No. 5,580,430, 1996; and J. B. Goodenough, H. Y. P. Hong, J. A. Kafalas, Fast Na+ ion transport in skeleton structures, Mater. Res. Bull. 11 (1976) 203.

Ceramatec, Inc. has developed phase pure and highly conducting NaSICON composition, contrary to what has been reported in the literature. The conductivity of the membranes is in the range of $10^{-2}$ S/cm to $10^{-1}$ S/cm from room temperature to 90° C., which are several orders higher than the conductivity of NaSICON compositions reported in the literature.

The stability or resistance to corrosive media of the preferred membrane materials described herein may be enhanced by chemistry variation. Ability to synthesize phase pure compositions based on variations in chemistry, substitution pattern at various sites of the structure, and processing methods has yielded highly sodium ion conductive compositions. The NAS-G, NAS-D, NAS-E, NAS-F, and NAS-H series of NaSICON compositions provide benefits in ionic conductivity, corrosion resistance, transfer efficiency, and mechanical properties. The thermodynamic analysis show the structure of the modified NaSICON compositions through ionic substitution by crystal chemistry approach provides excellent chemical stability in corrosive environments (i.e., acidic or caustic or organic solvents). These membranes are particularly suitable for electrolytic decomposition of sodium salts to produce sodium based organic and inorganic chemicals. However, other NaSICON-type formulations which have one or more of the preferred characteristics described herein are equally as suitable.

The membrane may have flat plate geometry, tubular geometry, or supported geometry. The solid membrane is preferably sandwiched between two pockets, preferably made of a chemically-resistant HDPE plastic and sealed, preferably by compression loading using a suitable gasket or o-ring, such as an EPDM o-ring.

The phrase "significantly impermeable to water", as used herein, means that a small amount of water may pass through the membrane, but that the amount that passes through is not of a quantity to diminish the usefulness of the sodium methylate solution product. The phrase "essentially impermeable to water", as used herein, means that no water passes through or that if water passes through the membrane, its passage is so limited so as to be undetectable by conventional means. The words "significantly" and "essentially" are used similarly as intensifiers in other places within this specification.

The NaSICON type materials or modified NaSICON materials referred herein are useful, for example, as sodium-ion conducting membranes in electrolytic cells. For the production of sodium methylate, as an example, an aqueous solution of sodium hydroxide, is charged into the anolyte chamber. A dilute solution of sodium methoxide or pure methanol is charged into the catholyte chamber. It is desirable to start with conductive electrolyte to keep the operating voltage of cell as low as practical.

An example of an overall electrolytic reaction, using sodium hydroxide as the source of sodium ion, is as follows:

Anode: $2OH^- \rightarrow \frac{1}{2}O_2 + H_2O + 2e^-$
Cathode: $2CH_3OH + 2e^- + 2Na^+ \rightarrow 2NaCH_3O + H_2$
Overall: $2CH_3OH + 2NaOH \rightarrow 2NaOCH_3 + H_2 + \frac{1}{2}O_2 + H_2O$ These reactions are electrolytic reactions (FIG. 2), taking place under an induced current wherein electrons are introduced or are removed to cause the reactions. The reactions proceed only so long as a current is flowing through the cell. Contrary to electrolytic reactions, galvanic reactions may occur when an applied potential to the cell is removed, which tends to reduce the efficiency of the electrolytic cell. It is preferred that only electrolytic reactions occur in the cell and that galvanic reactions be eliminated or, at least, greatly minimized.

The anolyte solution which is the source of the sodium cation or other alkali metal cation in the process may be a neutral salt, such as sodium chloride, or it may be a caustic solution such as sodium hydroxide. Solutions or by-products of industrial processes may be used as a sodium source. In a preferred embodiment, aqueous sodium hydroxide is used. Sodium hydroxide is a preferred solution because it is inexpensive and its use produces water and oxygen gas at the anode. Accordingly, although the discussion which follows is based on use of sodium hydroxide, it can be adapted to other sodium based chemicals, with the understanding that the reaction gas products at the anode will differ depending on the chemistry of the salt used in anolyte.

The sodium hydroxide (caustic) is fed into the anolyte compartment 4 through inlet 10. The sodium hydroxide solution may be of any grade or purity. The purity of the sodium hydroxide solution is not critical because the NaSICON membrane is selective to transport of sodium ions unlike organic membranes. Similarly, methanol is fed into the catholyte compartment 6 of the cell 2 through the inlet 12. The methanol is preferably free of moisture as its presence will lead to the formation of sodium methylate of low quality. In one embodiment, the catholyte compartment and/or the anolyte compartment is purged with one or more inert or nonflammable gases such as nitrogen and argon.

For sodium methylate production, the cell is preferably operated at temperatures from about 20° C. to about 80° C., including about 25° C., 30° C., 40° C., 50° C., 60° C., and 70° C., and ranges of temperatures bounded by these enumerated temperatures. Preferably, the temperature is maintained below the boiling point of the solutions used as catholyte alcohol sodium at which precipitation of the sodium methylate will occur in the product solution. The cell is preferably operated at ambient pressure, with the pressure in the two compartments being substantially equal.

Under the influence of the electric current, the sodium ions are transported from the anolyte side across the membrane to the catholyte side where the sodium ions react with methoxide to form sodium methylate, while hydroxyl ions are oxidized at the anode to produce oxygen. In a preferred embodiment, the concentration of sodium cation in the anolyte compartment 4 is maintained in a desired range by a combination of feeding additional sodium hydroxide 10 into the anolyte compartment and removing dilute or diluted caustic solution 16 from the anolyte compartment.

As the reactions progress, the concentration of sodium methylate in the catholyte compartment 6 begins to increase. Once the concentration reaches a desired level, sodium methylate solution product is preferably removed from the catholyte compartment through outlet 14, and its volume replaced by methanol through inlet 12. The concentration of sodium methylate in the catholyte outlet stream 14 may be monitored by any suitable means, including, but not limited to, specific gravity, sodium concentration, and other methods known in the art.

In preferred embodiments of electrochemical cell, the catholyte comprises one or more alkali alcoholates, and the anolyte comprises one or more aqueous inorganic and/or organic salts. Preferred sodium salts in the anolyte include sodium hydroxide, sodium chloride, sodium carbonate, sodium bicarbonate, sodium sulfate, sodium chlorate, sodium chloride, sodium nitrate, sodium phosphate, sodium perchlorate, sodium nitrite and other sodium based sodium salts, and combinations of two or more such salts. Salts of other alkali metals such as potassium, and lithium, and with these same anions, and other suitable anions, as well as combinations of salts having different anions, different cations or both, are also contemplated, including where sodium is not the metal cation being conducted by the electrolyte.

As discussed above, the electrochemical cell may be operated batch wise or continuously. Continuous operation in connection with the embodiment of FIG. 2 involves continuous introduction of methanol or low concentration of sodium methoxide in methanol to the catholyte and removal of desired concentration of sodium methoxide solution from the catholyte. This is paired with addition of NaOH (and/or another sodium salt) to the anolyte so that the concentration of the caustic is preferably substantially balanced with the concurrent transport of sodium ions across the membrane.

Batch wise operation involves charging the cell with a feed salt solution as the anolyte, dilute sodium methoxide solution or methanol as the catholyte and operating the cell at the desired temperature and voltage until a sodium methoxide in methanol solution having a desired concentration is obtained. Cells of the present invention employing NASICON membranes may be operated using relatively pure anolyte solutions, or by using relatively impure anolyte solutions such as by-products and contaminated impure caustic from industrial chemical processes. In one embodiment, caustic solutions of 50% by weight NaOH concentration are used.

Preferred methods, including that described above, are clean in that essentially all materials made from the process are useful, recyclable, and/or not environmentally harmful. For example, the dilute caustic solution 16 discharged from the anolyte compartment 4 may be concentrated and then used again, including being recycled back into this process. The oxygen 18 and hydrogen 20 gases produced at the anolyte compartment and the catholyte compartment, respectively, may be collected, transported, and/or pressurized for use. The gas may also be run through a condenser or a scrubber to remove impurities. The hydrogen gas produced can be used as a fuel or in an alternative energy source such as fuel cells. In one embodiment, the hydrogen gas produced by the cell is used, directly or indirectly, to power the cell and/or its components. Alternatively, the gaseous output may be vented to the environment, with or without the use of scrubbers, fire suppressors, or other safety precautions.

Preferred methods using sodium hydroxide as a starting solution are also generally cost effective as compared to other methods where sodium metal is reacted directly with methanol to form sodium methylate. Sodium hydroxide is easier and safer to handle than sodium metal, which requires special storage, handling, and delivery systems to prevent auto-ignition of sodium metal or its violent exothermic reaction with water in the environment. Sodium hydroxide is generally also less expensive than sodium metal for an equivalent molar quantity of sodium atoms.

In view of the foregoing general principles and considerations, methods for producing sodium methylate solution may be carried out. One preferred method comprises feeding methanol into a catholyte compartment of an electrolytic cell, feeding sodium hydroxide or other sodium-containing caustic solution into the anolyte compartment of the cell, and applying an electric current to the cell, wherein the anolyte and catholyte compartments are separated by a membrane that selectively transports sodium ions and is substantially impermeable to water. The cell may operate in continuous mode, in batch mode, or some combination of the two. The membrane is preferably ceramic and has one or more of the preferred properties set forth hereinabove.

In a preferred embodiment where sodium methylate in methanol is made, the sodium methylate solution produced preferably comprises about 1% to about 32% by weight sodium methylate in methanol, preferably about 20% to about 32% or about 25% to about 28% by weight, including those having 23%, 24%, 26%, 27%, 29%, 30%, and 31% sodium methylate by weight. Solutions having sodium methylate concentrations above and below these limits are also presently contemplated, keeping in mind that concentrations significantly above 33% may not be desirable as the saturation point of the sodium methylate in methanol solution is reached. The sodium methylate produced preferably has a high purity, with the purity being primarily limited by the purity of methanol that is used as a starting material. Preferred sodium methylate solutions are also substantially free of mercury and/or other heavy metals. As used herein, "substantially free" of mercury is a broad functional term that includes where there is essentially no mercury detectable within test limits ("essentially free") and where there is a small amount of mercury detected, but not at a quantity to limit the material's use in biodiesel production. In one embodiment, the amount of mercury in the solution is not detectable by methods of detection used in the art. In a preferred embodiment, the sodium methylate solution is colorless or substantially colorless.

Some preferred embodiments are illustrated by the examples which follow. These examples are intended for illustration only, and are not intended to be limiting.

Example 1

Three of Ceramatec's coded membrane compositions, among the family of NASICON membranes (NASD, NASE, and NASG) were evaluated in single membrane cells, to synthesize sodium methoxide from caustic and methanol. Individual, 900 microns thick single membrane (14.27 cm$^2$ area) was assembled in a two compartment open cell with platinum electrodes. The cells were operated at a temperature of 24° C. at constant current density of 100 mA/cm$^2$. The voltage (IR) drop across the membrane was measured with lugging capillaries set up. The concentration of the starting catholyte solution was 9.5 wt % sodium methoxide in methanol. The solution was prepared by mixing crystals of sodium methoxide from vendor with methanol. The resulting starting solutions were slightly yellowish in color.

Figure 3:
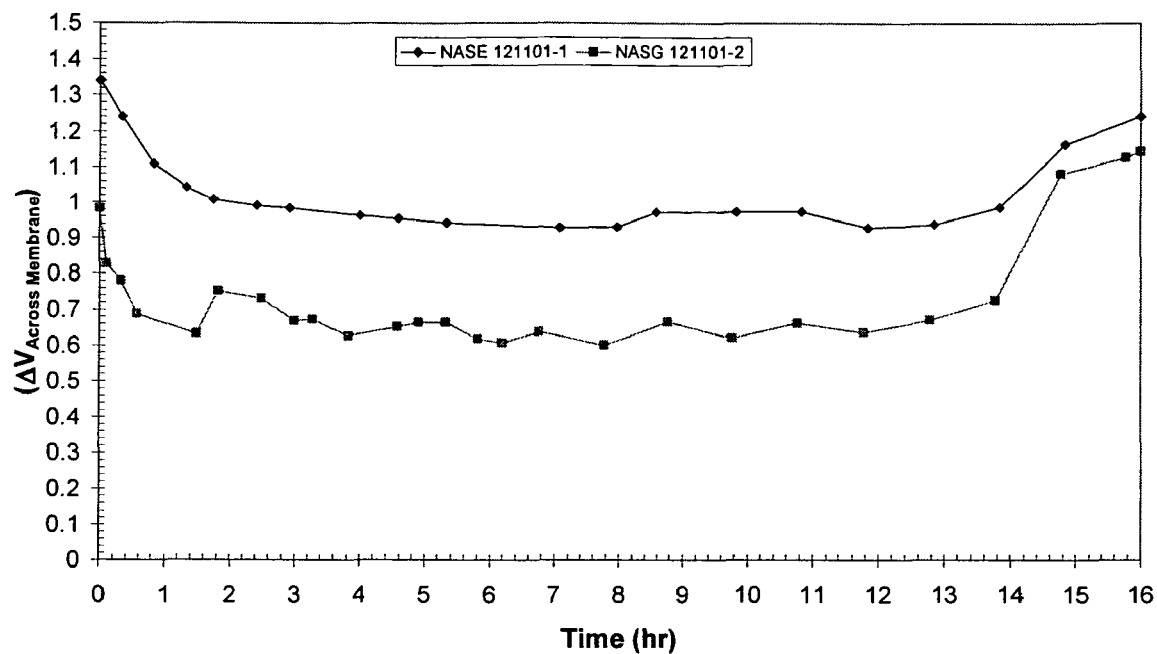
FIG. 3 is a graph illustrating the performance of NAS-E and NAS-G membranes under similar operating conditions.

The performance of two independent cells tested with the NASE and NASG membranes is graphically shown in FIG. 3. The NASG membrane has a lower voltage drop across the membrane compared to the NASE membrane at similar operating conditions. The voltage drop of the NASG membrane averaged around 0.7 volts as compared to 1 volt for the NAS E membrane.

Example 2

An experiment was performed to determine the ionic resistance of sodium methoxide as a function of operating parameters such as concentration, temperature, and electrode distance. An open cell was assembled with no membrane between the electrodes. An electrode spacing apparatus was used to adjust the distance between electrodes. Sodium methoxide solutions at 20, 25, and 30 wt % grades were prepared and their resistances were measured at three different temperatures (25, 30, and 40° C.) using the A.C. impendence spectrometry.

Figure 4:
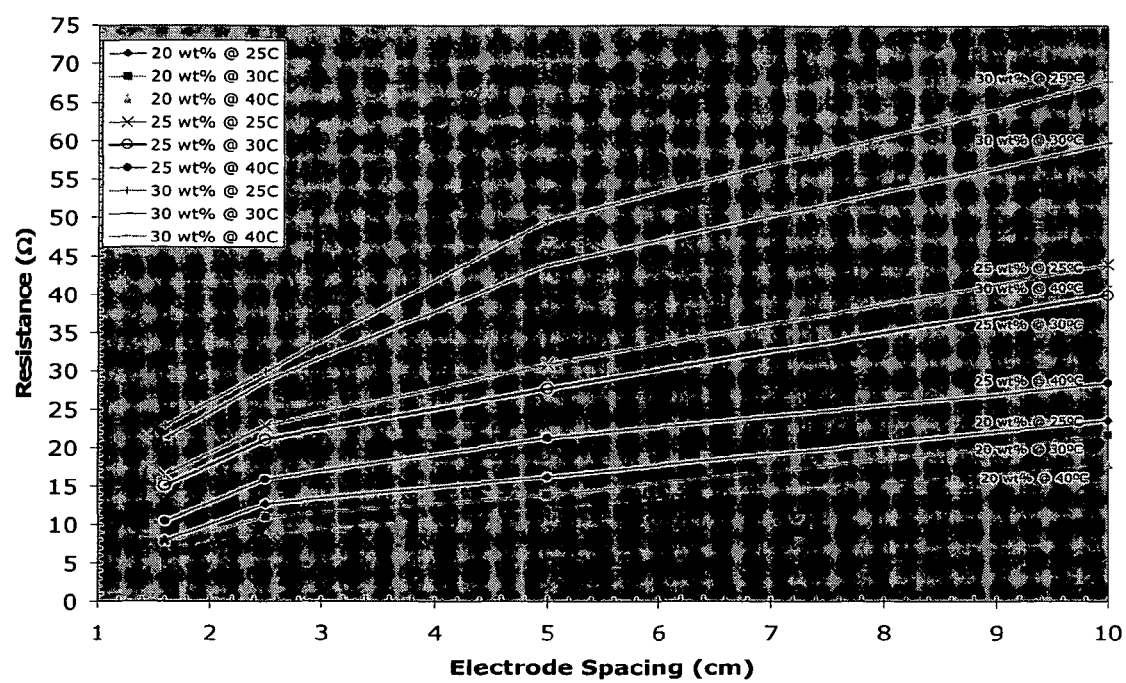
FIG. 4 is a graph illustrating the effect of temperature and sodium methylate concentration on resistance of sodium methylate solution.

The results are shown in FIG. 4. The biggest contributor to the overall resistance of the cell is the sodium methylate solution. The solution resistance ranges from 5 to 70 ohms depending on the operating parameters. The tests show that the electrical conductivity of the sodium methylate solution is function of concentration and temperature of the solution.

Example 3

An experiment was conducted to evaluate the effect of flow rates of anolyte and catholyte, and electrode distance from the membrane on cell performance. This test was conducted in a standup closed laboratory-scale cell, such as the commercial Electro Cell MP (Chematur Engineering AB, Karlskoga, Sweden). The electrodes were initially placed at approximately 0.5 cm away from the membrane on either side. Using a peristaltic pump, the initial flow rate was set at 2.5 setting on the pump speed controller and the cell was operated until steady voltage was achieved. The flow rate was then increased to the 7.5 setting on the speed controller.

Figure 5:
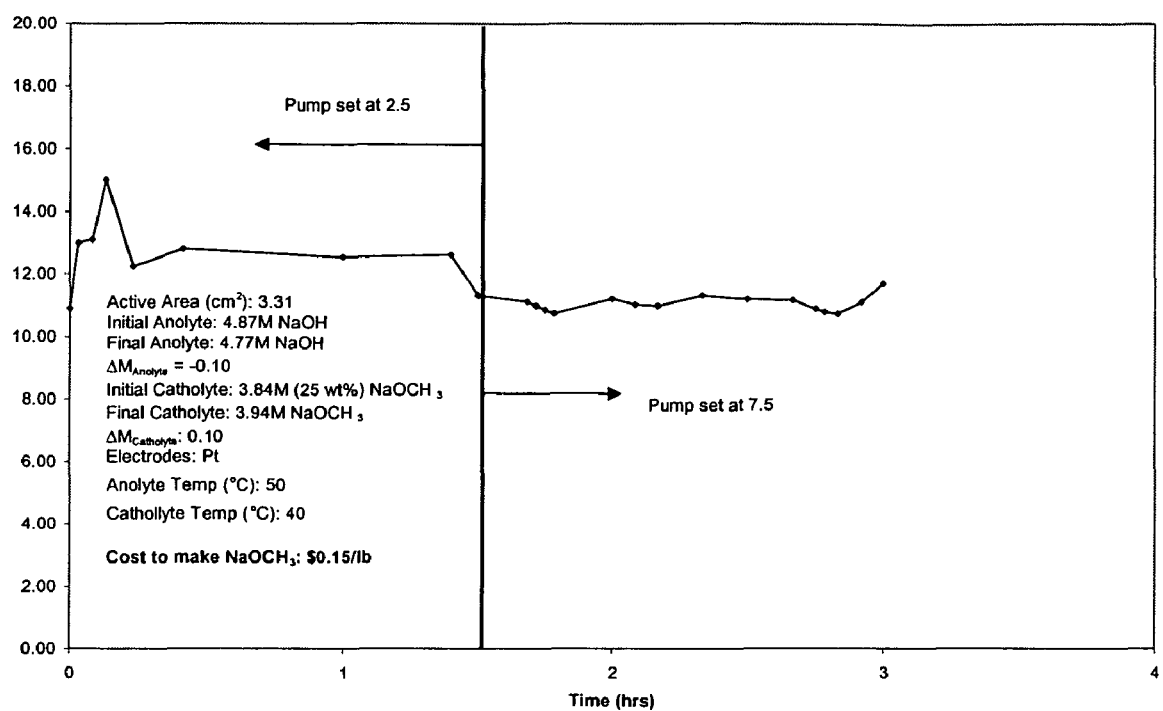
FIG. 5 illustrates the effect of anolyte and catholyte recycling flow rates on the over-all voltage of sodium methylate producing cell.

The results and other details of the experiment are shown in FIG. 5. The total voltage of the cell drops as the flow rate of the solution increases due to better dissipation of gases evolved at the electrodes, contributing positively to the overall cell operation and the conductivity of solutions.

Example 4

Two-inch diameter circular NAS-G membranes with a total active area of 34.63 cm were housed in a high-density polyethylene (HDPE) scaffold and retrofitted into a two-compartment electrochemical cell. DSA electrodes were used in the cell for this test. The flow rates of the anolyte and catholyte solutions in this test were maintained at 1.6 gal/min. The testing parameters and the results are listed in Table I. The performance of the cell is presented in FIG. 6. There was a gradual increase in the cell voltage during the course of test which is attributed to the changes in the concentrations of the anolyte and catholyte solutions.

Figure 6:
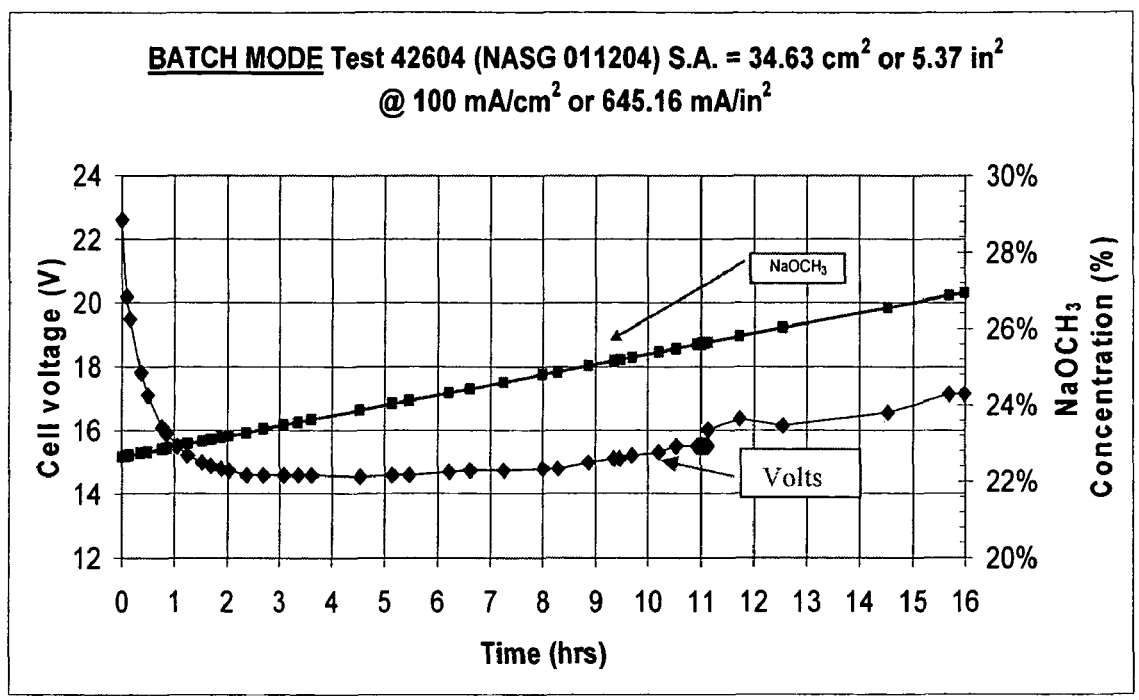
FIG. 6 illustrates the changes in voltage and concentration of sodium methylate solution with time of a sodium methylate producing cell operating at constant current density.

The anolyte was a 16 wt % NaOH solution and the catholyte was 22.63 weight % sodium methoxide solution. The cell was operated in galvanostatic mode at 100 mA/cm current density in a circulating batch mode. This test was performed at a temperature of 30° C. FIG. 6 represents the performance of NAS-G membrane based cell to produce sodium methoxide. The gradual increase in cell voltage after 16 hours of performance is attributed to changes in concentration of the caustic in the anolyte and sodium methoxide in the catholyte. The voltage held steady during the first 8 hours of continuous operation. The flow rates of anolyte and catholyte solutions were maintained at 1.6 gal/min. The operating conditions and test results are listed in Table I below. Sodium methylate was made in the catholyte side of the cell. The objective of this test to produce sodium methylate from caustic and methanol was successfully met. A 4.28 wt % increase in concentration of sodium methylate in the catholyte was measured after the test.

TABLE I

Test parameters and results

| Test 42604 Parameters: | | | | | | | |
|---|---|---|---|---|---|---|---|
| Amps | 3.46 | | Total Amp hrs | 55.47 | | | |
| Anode | DSA | | Total kWhrs | 0.861 | | | |
| Cathode | Ni | | Anode % CE | 96.27% | | | |
| Membrane | NASG 11204 | | KW.hr/lb$_{NaOCH3}$ | 3.63 | | | |
| Area (cm$^2$) | 34.63 | | NaOCH$_3$ gain in Cath (g) | 107.65 | | | |
| Thickness (mm) | 1.3 | | | | | | |
| Mass Balance: | | | | | | | |
| 0 Hrs | | | | | | | |
| Start | Volume (ml) | S.G. | Total wt (g) | wt % | | | M (mole/Liter$_{sol}$) |
| Anolyte | 3869 | 1.163 | 4500 | 15.99 | | | 4.465 |
| Catholyte | 3822 | 0.919 | 3513 | 22.63 | | | 3.85 |
| Totals | 7691.61 | | 8013 | | | | |
| 16.033 Hrs | | | | | | | |
| End | Volume (ml) | S.G. | Total wt (g) | wt % | Theoretical Na$^+$ change (g) | Actual Na$^+$ change (g) | M (mole/Liter$_{sol}$) |
| Anolyte | 3869 | 1.1 | 4256.2 | 14.36 | 47.585 | 45.812 | 4.465 |
| Catholyte | 3507 | 0.886 | 3107 | 26.91 | | | 3.85 |
| Totals | 7376 | | 7364 | | | | |
| | | Recovery: | 92% | | | | |

*Material balance does not include solution loss due to evaporation.

Example 5

The NAS-G membranes and cell set up used in Example 4 were used to perform in this test. The anolyte was operated in a continuous mode, and catholyte in a batch mode. This test was performed to evaluate the cell performance at different operating current densities. The effect of temperature and sodium current density on the performance of membranes was measured. The operating conditions and results of this test are reported in Table II.

Figure 7:
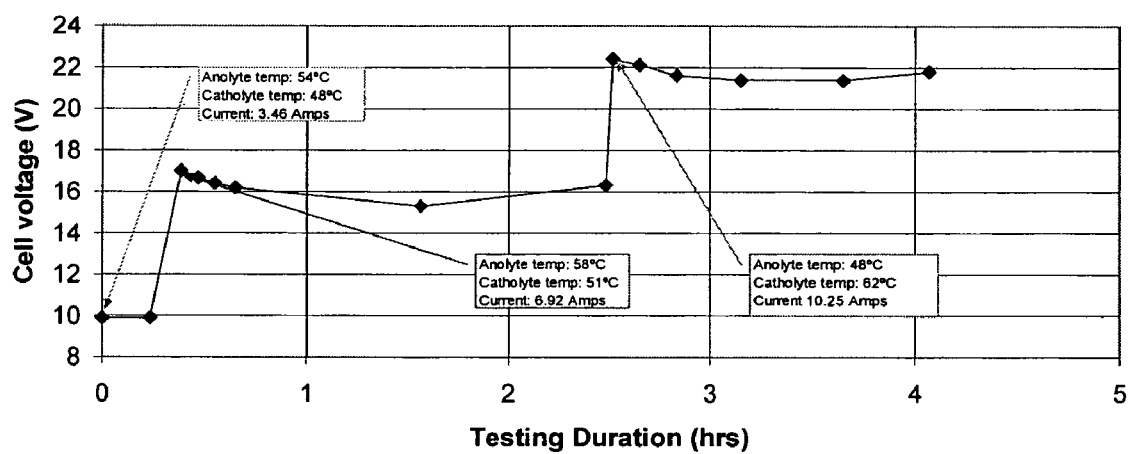
FIG. 7 is a plot of the voltage of a sodium methylate producing cell at different current densities.

Initially the cell was operated at a current density of 100 mA/cm$^2$ for 30 minutes, then the current was increased to 200 mA/cm$^2$ until 2.5 hours, when the current was finally increased to approx 300 mA/cm$^2$. As the current was increased at each step in this test, the temperature likewise increased due to heat transfer and exothermic reaction in the catholyte. The membranes performed consistently at the high current density (300 mA/cm$^2$) as shown in the FIG. 7.

TABLE II

Test parameters and results

| I. TEST 42904 | Anolyte | Catholyte | Current Density mA/cm$^2$ | mA/in$^2$ |
|---|---|---|---|---|
| Initial Concentration (M) | 4.465 | 2.92 | | |
| Final Concentration (M) | NA | 3.34 | | |
| Initial wt % | 16 | 18.15 | | |
| Final wt % | NA | 20.07 | | |
| Temperature (° C.) | 54 | 48 | 100 | 645.16 |
| | 58 | 51 | 200 | 1290.32 |
| | 48 | 62 | 296 | 1909.67 |
| Surface Area (cm$^2$) | 34.63 | | | |
| Surface Area (in$^2$) | 5.37 | | | |
| Test Duration (hrs) | 4.07 | | | |

Example 6

This test was performed with the NASICON ceramic membrane-based prototype cell (Electro Cell NP) to produce high concentration sodium methylate from sodium hydroxide and methanol. Four NASG membranes (1.5 inch diameter and 1.3 mm thickness) were housed in a HDPE scaffolds and retrofitted into Electro Cell MP. This test was conducted with the anolyte held at a temperature of 50° C. and the catholyte at a temperature of 25° C.

Figure 8:
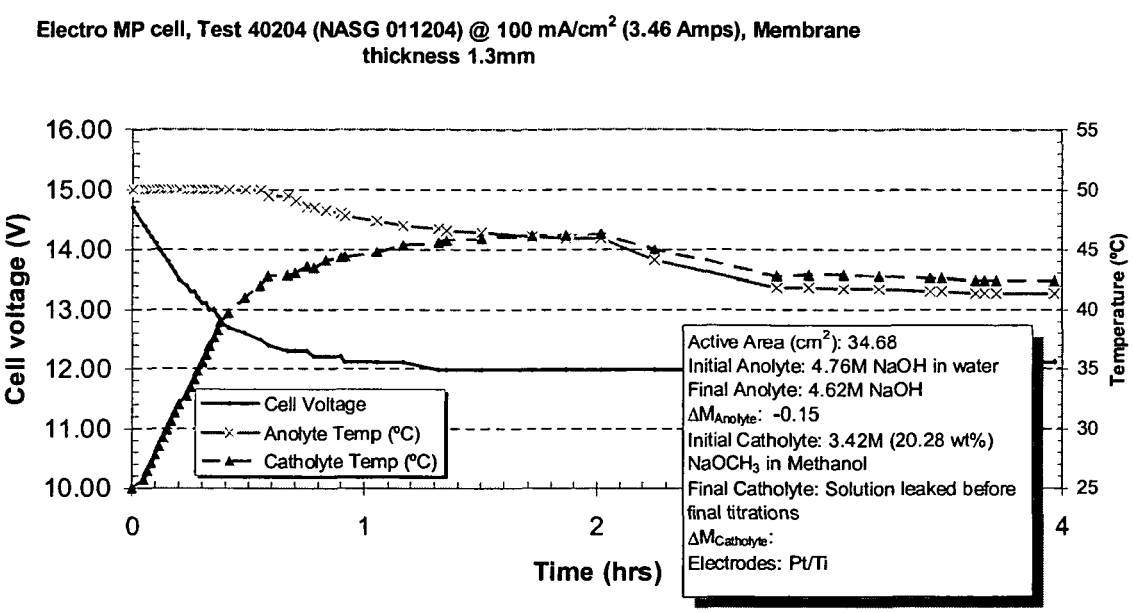
FIG. 8 is a plot of the voltage, temperatures of anolyte and catholyte solutions, as a function of testing time of a sodium methylate producing cell.

Heating the anolyte to a temperature of 50° C. caused the catholyte to heat up as well due to heat transfer across the scaffold. A low operating cell voltage was observed in this test (FIG. 8). As the test continued, the catholyte heated up quickly and eventually exceeded the anolyte's temperature, indicating an exothermic reactions taking place in the catholyte chamber of the cell.

This test was carried out for four hours to prove the demonstration with a prototype cell to make sodium methoxide.

Example 7

This test was conducted to produce sodium methylate by purging the catholyte holding tank with nitrogen gas as a blanket.

A single, NASG membrane was assembled in an open cell, which was operated at room temperature with nitrogen gas bubbling through the sodium methoxide solution in the catholyte chamber. The open cell had two small openings at the top of each compartment of the cell to insert lugging capillaries. The lugging capillaries specifically allow continuous monitoring of the IR drop (voltage) across the membrane during steady state operation of a cell. The platinum electrodes in this laboratory scale design were spaced about 6 cm on either side of the membrane. Starting sodium methoxide solution was prepared from a 30 wt % solution of methoxide, supplied by vendor (ACROS), and diluted with anhydrous methanol to a 10 wt % solution.

Figure 9:
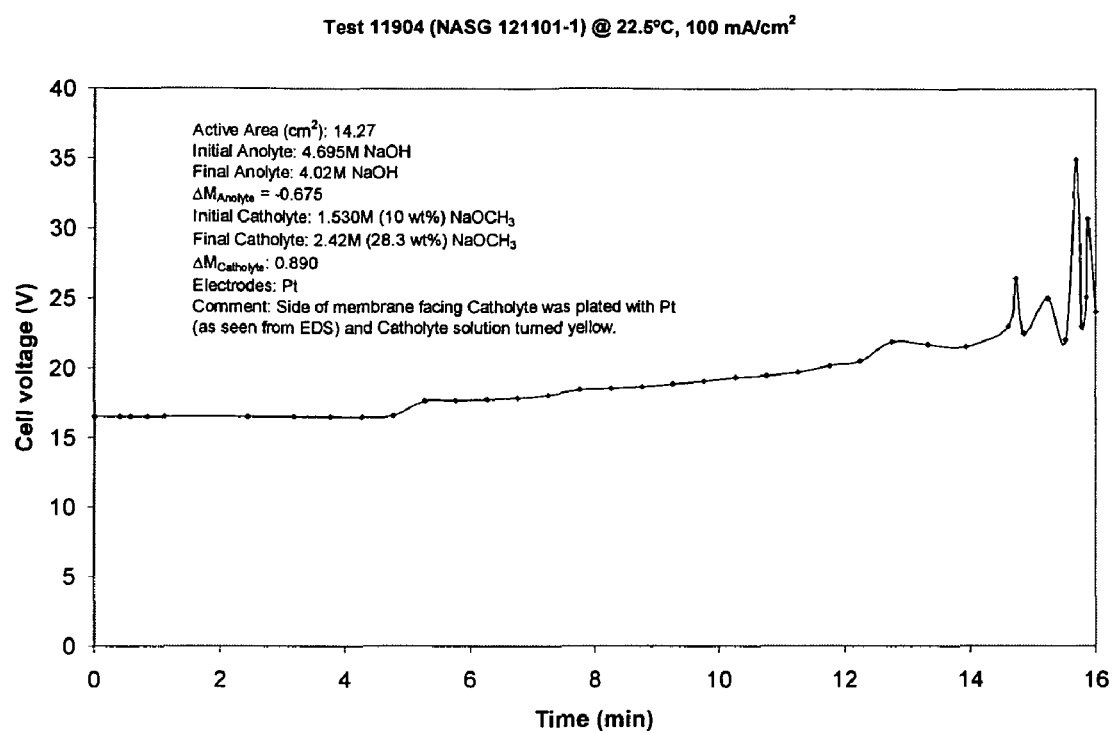
FIG. 9 is an open cell test with nitrogen bubbled into the catholyte chamber of the cell containing sodium methoxide.

In this test, the concentration of sodium methylate increased from a 10 wt % solution to 28.3 wt %, (FIG. 9). The cell was operated for a total of 16 hours. The final product had a tint of light yellow. The discoloration of the sodium methoxide was found to be due to the reaction of sodium methoxide with the tubing material and not from the lack of nitrogen blanket, which is useful to keep the sodium methoxide from reacting with atmospheric moisture, forming caustic and consequently causing sodium methylate contamination.

Example 8

A larger scaffold was designed and manufactured at Ceramatec, to house four 2-inch diameter membranes to provide an active area of 60 cm$^2$. This cell was used to demonstrate continuous and batch mode operations and to complete one specific test lasting over 43 hours to optimize the electrochemical factors as a function of starting concentration of sodium methylate in the catholyte.

One test was performed under nitrogen blanket to prevent sodium methoxide from reacting with the atmospheric moisture to form caustic and to prevent chemistry changes.

A summary of the results from several batch tests is provided in Table III below. Test number 7, provides interesting and useful information. It shows that operating the cell in a batch mode can be more beneficial, in terms of power consumption, than operating it in a continuous mode, which would require maintaining sodium methylate concentration in the catholyte between 25 to 28% range at all the times during the operation.

The sodium transfer efficiency of the anolyte and catholyte in all the tests was above 90%.

The ceramic membranes showed no signs of degradation based on x-ray diffraction and scanning electron microscope analysis or loss of steady state performance.

TABLE III

Summary of tests results

| Batch mode tests | Starting NaOCH$_3$ wt % | Final NaOCH$_3$ wt % | Duration of test (hrs) | Starting cell voltage | Ending cell voltage | Operation mode | Cell Temp (° C.) | N$_2$ flow |
|---|---|---|---|---|---|---|---|---|
| 1 | 23.83 | 26.65 | 10.6 | 14.5 | 16.3 | Batch | 50 | No |
| 2 | 20.34 | 23.7 | 11.7 | 11.4 | 13.3 | Batch | 50 | No |
| 3 | 23.7 | 26.91 | 11.6 | 14 | 16.7 | Batch | 50 | No |
| 4 | 26.91 | 29.44 | 9.6 | 12.5 | 22.5 | Batch | 50 | No |
| 5 | 20.34 | 27.07 | 21.7 | 12.3 | 17.2 | (A) Cont. | 50 | No |
| 6 | 11.35 | 22.33 | 19.77 | 8.6 | 12.8 | Batch | 50 | No |
| 7 | 5.41 | 29.5 | 43.22 | 9.1 | 17.5 | (A) Cont. | 50 | Yes |

Figure 10:
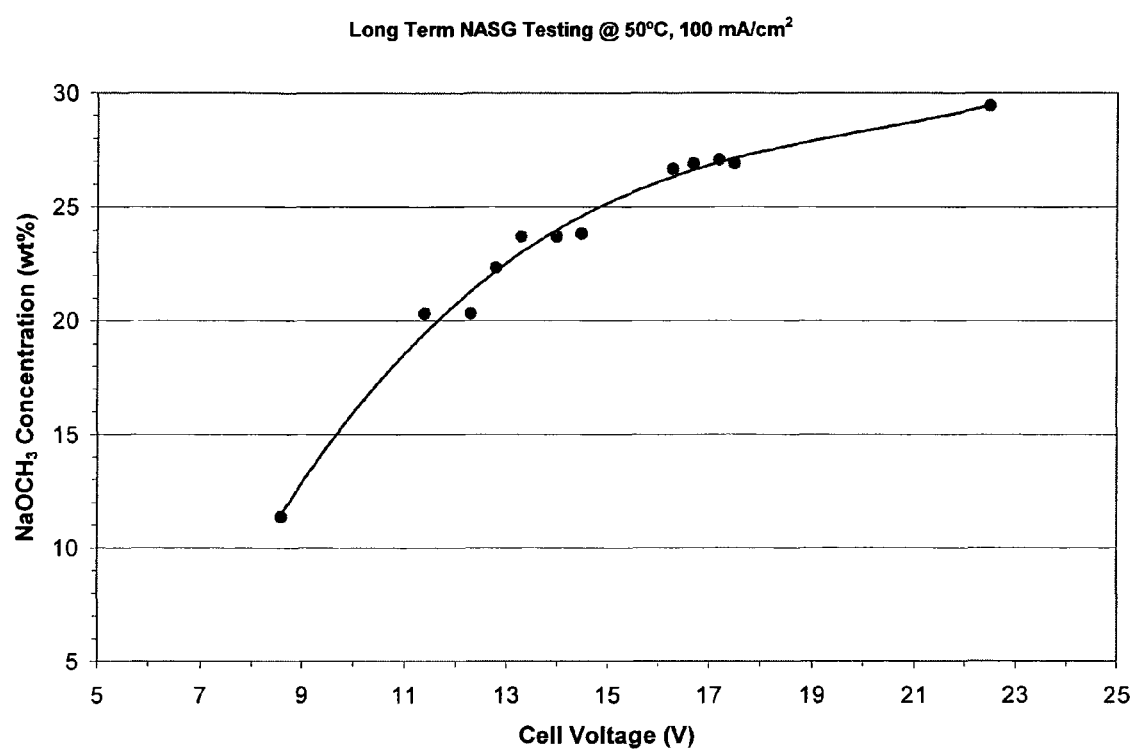
FIG. 10 is a plot of estimated cell voltage versus concentration of sodium methylate solution.

The concentration of sodium methoxide produced in a 60 cm² active area NAS-G membrane based cell (Electro-Cell MP) as a function of operating voltage is shown in FIG. 10. The graph shows the calibration curve for estimated voltages required to achieve desired concentration of sodium methoxide in the catholyte compartment of NAS-G membrane based electrochemical cell operating at 100 mA/cm² current density, and at approximately 50° C. temperature.

Example 9

All the tests were performed with clear and reagent-grade caustic solution as alyte. Also, DSA electrodes were used in all the tests. The process to make sodium methylate will work equally efficiently when an impure caustic from azide plant or other sodium based industrial or contaminated aqueous salts are used as the starting anolyte precursor, with nickel or stainless steel electrodes. Several tests were carried out using impure caustic and nickel electrodes.

Figure 11:
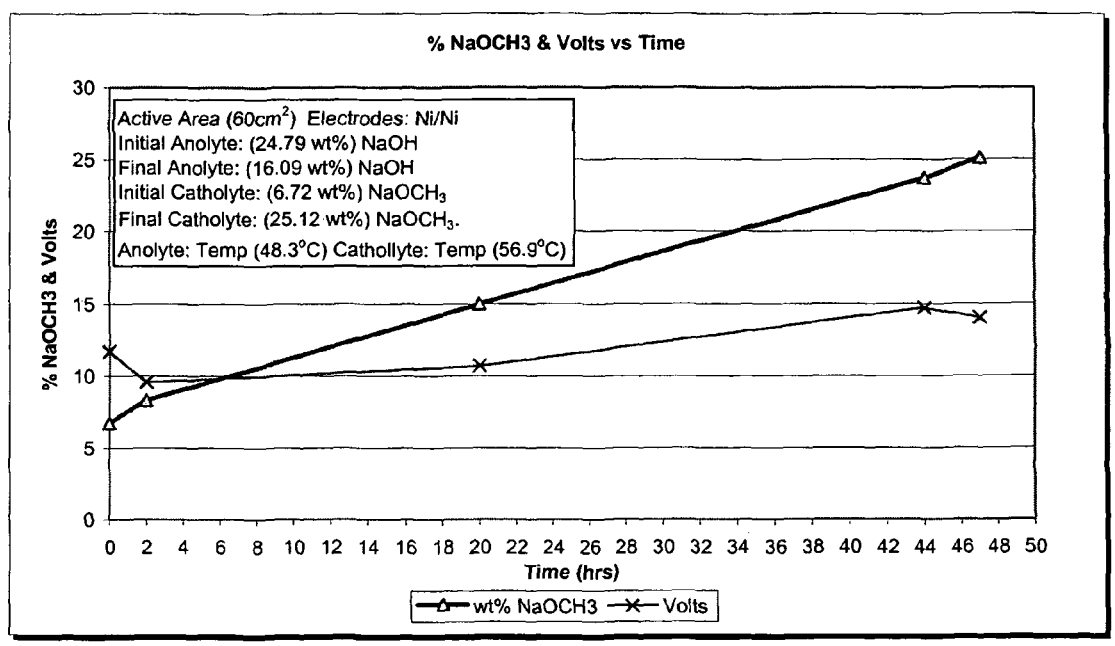
FIG. 11 is a plot of changes in cell voltage and sodium methylate concentration of catholyte as a function of testing time using pure caustic solution as anolyte.
Figure 12:
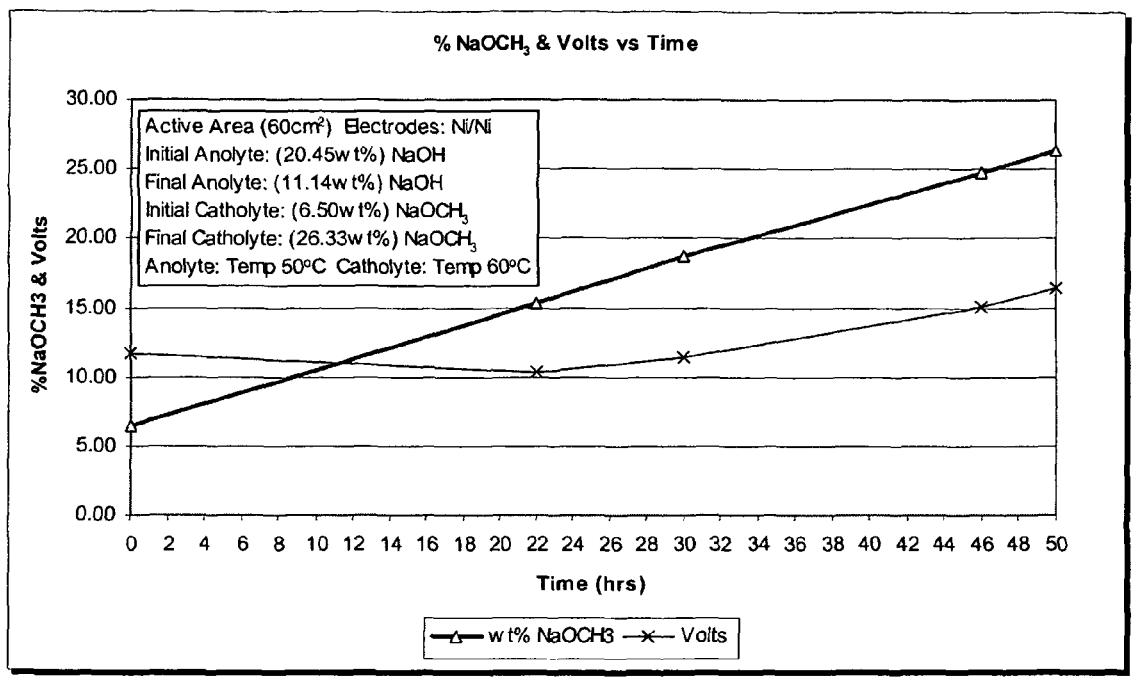
FIG. 12 is a plot of changes in cell voltage and sodium methylate concentration of catholyte as a function of testing time using impure caustic solution as anolyte.
Figure 13:
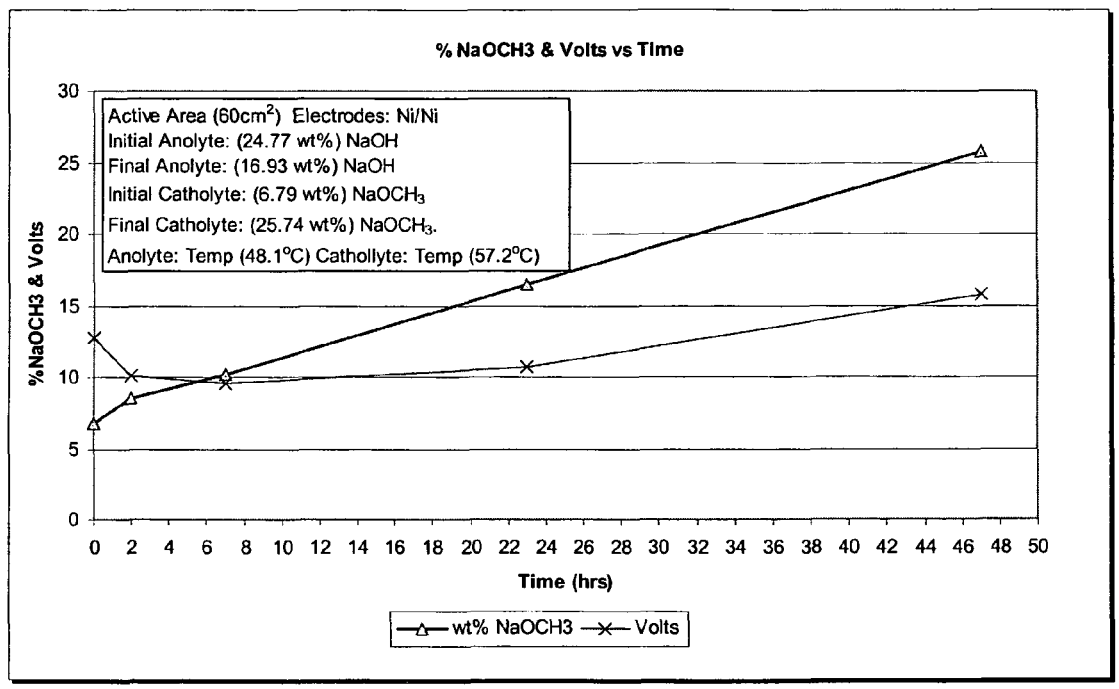
FIG. 13 is a plot of changes in cell voltage and sodium methylate concentration of catholyte as a function of testing time using impure caustic solution as anolyte.

The results from the tests are given below in Tables IV, V and VI. Tests were conducted with pure caustic (Table IV), impure caustic with 1.4% azide (Table V), and impure caustic with 7.5% azide (Table VI). FIGS. 11, 12 and 13 show cell performance to produce sodium methylate from pure and impure sodium hydroxide solutions as anolyte.

The results show that the process is oblivious to the caustic purity. NaSICON membrane based process provides the similar sodium transfer current efficiency with clean or impure caustic.

TABLE IV

Results of the tests conducted with clean caustic

| Parameters: | | | | | | |
|---|---|---|---|---|---|---|
| Amps | 7.0 | | | Results: | | |
| Anode | Ni | | | Cath % CE | 107.10% | |
| Cathode | Ni | | | kWhr/lb NaOCH₃ | 2.95 | |
| Area (cm²) | 60 | | | | | |
| Thickness (mm) | 1.3 | | | | | |

Mass Balance:
0.00 hrs

| Start | Volume (ml) | S.G. | Total wt (g) | wt % | | |
|---|---|---|---|---|---|---|
| Anolyte | 4025.00 | 1.280 | 5152.00 | 24.79 | | |
| Catholyte | 4300.00 | 0.827 | 3556.10 | 6.72 | | |
| totals: | 8325.00 | | 8708.10 | | | |

47.00 hrs

| End | Volume (ml) | S.G. | Total wt (g) | wt % | Theoretical Na⁺ change (g) | Actual Na⁺ change (g) |
|---|---|---|---|---|---|---|
| Anolyte | 3925.00 | 1.172 | 4600.10 | 16.09 | 282.35 | 308.83 |
| Catholyte | 4000.00 | 0.945 | 3778.28 | 25.12 | 282.35 | 302.40 |
| totals: | 7925.00 | | 8378.38 | | | |
| | | Recovery: | 96.21% | | | |

| sample | time (hrs) | Volts | Amphrs | KWhrs | Anolyte temp ° C. | Catholyte temp ° C. |
|---|---|---|---|---|---|---|
| 1 | 0 | 11.7 | 0.00 | 0.00 | 49.2 | 26.7 |
| 2 | 47.00 | 14.0 | 329.00 | 4.61 | 48.3 | 56.9 |

*-Not counting the amount recovered in the condenser

TABLE V

Results of the tests conducted with impure caustic

| Parameters: | | Assay of starting Anolyte | |
|---|---|---|---|
| | | Al | 15 mg/L |
| | | Ba | 6 mg/L |
| Amps | 7.0 | Ca | 1 mg/L |
| Anode | Ni | Fe | 2 mg/L |
| Cathode | Ni | K | 965 mg/L |
| Area (cm²) | 60 | Mo | 23 mg/L |
| Thickness (mm) | 1.3 | Zn | 1 mg/L |
| Results: | | Cl | 2593 ppm |
| Cath % CE | 100.81% | NO₃ | 248 ppm |
| | | NaN₃ | 14348 ppm |
| | | SO₄ | 287 ppm |

Mass Balance:
0.00 hrs

| Start | Volume (ml) | S.G. | Total wt (g) | wt % | NaN₃ (g) |
|---|---|---|---|---|---|
| Anolyte | 4275.00 | 1.216 | 5198.40 | 20.45 | 75 |
| Catholyte | 4250.00 | 0.816 | 3467.58 | 6.50 | |
| totals: | 8525.00 | | 8665.98 | | |

TABLE V-continued

Results of the tests conducted with impure caustic 50.00 hrs

| End | Volume (ml) | S.G. | Total wt (g) | wt % | NaN$_3$ (g) | Theoretical Na$^+$ change (g) | Actual Na$^+$ change (g) |
|---|---|---|---|---|---|---|---|
| Anolyte | 4225.00 | 1.108 | 4680.88 | 11.14 | 67 | 300.37 | 311.60 |
| Catholyte | 3800.00 | 0.936 | 3555.28 | 26.33 | | 300.37 | 302.82 |
| totals: | 8025.00 | | 8236.16 | | | | |
| | | Recovery: | 95.04% | | | | |

| sample | time (hrs) | Volts | Amphrs | KWhrs | Anolyte temp °C. | Catholyte temp °C. |
|---|---|---|---|---|---|---|
| 1 | 0 | 11.7 | 0.00 | 0.00 | 45.1 | 28.6 |
| 2 | 50.00 | 16.4 | 350.00 | 5.74 | 49.7 | 60.0 |

*-Not counting the amount recovered in the condenser

TABLE VI

Results of the tests conducted with impure caustic

Parameters:
- Amps: 7.0
- Anode: Ni
- Cathode: Ni
- Area (cm$^2$): 60
- Thickness (mm): 1.3

Results:
- Cath % CE: 107.69%

Assay of starting Anolyte

| | |
|---|---|
| Al | 17 mg/L |
| Ba | 6 mg/L |
| Ca | 2 mg/L |
| Fe | 2 mg/L |
| K | 1413 mg/L |
| Mo | 23 mg/L |
| Zn | 1 mg/L |
| Cl | 3204 ppm |
| NO$_3$ | 226 ppm |
| NaN$_3$ | 74900 ppm |
| SO$_4$ | 549 ppm |

Mass Balance:

0.00 hrs

| Start | Volume (ml) | S.G. | Total wt (g) | wt % | NaN$_3$ (g) |
|---|---|---|---|---|---|
| Anolyte | 4525.00 | 1.305 | 5905.13 | 24.77 | 442 |
| Catholyte | 4250.00 | 0.818 | 3476.50 | 6.79 | |
| totals: | 8775.00 | | 9381.63 | | |

47.00 hrs

| End | Volume (ml) | S.G. | Total wt (g) | wt % | NaN$_3$ (g) | Theoretical Na$^+$ change (g) | Actual Na$^+$ change (g) |
|---|---|---|---|---|---|---|---|
| Anolyte | 4475.00 | 1.228 | 5495.30 | 16.93 | 417 | 282.35 | 306.17 |
| Catholyte | 3900.00 | 0.946 | 3689.40 | 25.74 | | 282.35 | 304.07 |
| totals: | 8375.00 | | 9184.70 | | | | |
| | | recovery: | 97.90% | | | | |

| sample | time (hrs) | Volts | Amphrs | KWhrs | Anolyte temp °C. | Catholyte temp °C. |
|---|---|---|---|---|---|---|
| 1 | 0 | 12.8 | 0.00 | 0.00 | 40.7 | 27.0 |
| 2 | 47.00 | 15.8 | 329.00 | 5.20 | 48.1 | 57.2 |

*-Not counting the amount recovered in the condenser

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features, materials and conditions. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein, but instead that it includes all modifications and alternatives coming within the true scope and spirit of the invention as embodied in the attached claims.

What is claimed is:

1. A method for producing sodium methylate solution, the method comprising:
    feeding a catholyte solution comprising methanol or a dilute solution of sodium methoxide in methanol into a catholyte compartment of an electrolytic cell;
    feeding an anolyte solution comprising an aqueous solution of one or more sodium salts into an anolyte compartment of the cell; and
    applying an electric voltage to the cell sufficient to electrolyze the one or more sodium salts,
    wherein the anolyte compartment and the catholyte compartment are separated by a ceramic membrane comprising a NaSICON type or modified NaSICON type material that, upon flow of the electric current, selectively transports sodium cations from the anolyte compartment to the catholyte compartment, and is substantially impermeable to water, and is substantially impermeable to methanol and a dilute solution of sodium methoxide, wherein the ceramic membrane operates at a current density of at least about 100 mA/cm$^2$; whereby sodium methylate solution is formed in the catholyte compartment of the cell; and
    wherein the anolyte compartment is maintained at a temperature below about 80° C. during sodium salt electrolysis.

2. The method according to claim 1, wherein the ceramic membrane operates at a current density of at least about 500 mA/cm$^2$.

3. The method according to claim 1, wherein the sodium methylate solution formed has a concentration of at least 23% by weight.

4. The method according to claim 3, wherein the sodium methylate solution formed has a concentration of about 25% to about 28% by weight.

5. The method according to claim 1, wherein the methanol is continuously or intermittently fed into the catholyte compartment and the sodium methylate solution is continuously or intermittently removed from the catholyte compartment.

6. The method according to claim 1, wherein an aqueous solution of one or more sodium salts is continuously or intermittently fed into the anolyte compartment and dilute sodium hydroxide solution and/or water is continuously or intermittently removed from the anolyte compartment.

7. The method according to claim 1, wherein the sodium methylate solution is pure and substantially free from contaminants including mercury.

8. The method according to claim 1, wherein the sodium methylate solution is substantially colorless.

9. The method according to claim 1, wherein the sodium methylate solution is substantially anhydrous, wherein the moisture content in sodium methylate is less than 0.2%.

10. The method according to claim 1, wherein the ceramic membrane comprises a material having the formula $M^1M^2A(BO_4)_3$ where $M^1$ and $M^2$ are independently chosen from Na, Li, and K; and A and B are independently selected from elements having a valence of 2+, 3+, 4+, or 5+.

11. The method according to claim 1, wherein the anolyte and catholyte solutions are at temperatures less than their boiling points.

12. The method according to claim 1, wherein the one or more sodium salts comprise inorganic and/or organic salts of sodium, and combinations of two or more such salts.

13. The method according to claim 1, wherein the one or more sodium salts are selected from the group consisting of sodium carbonate, sodium nitrate, sodium phosphate, sodium hypochlorite, sodium chloride, sodium perchlorate, sodium hydroxide, sodium bicarbonate, sodium sulfate, sodium chlorate, sodium nitrite, and other sodium based inorganic and organic salts.

14. The method of claim 1 wherein the membrane is in the form of a solid planar plate.

15. The method of claim 1 wherein the membrane is in the form of tubular and porous supported geometries.

16. The method of claim 1 wherein the membrane is coated with other sodium ion conducting oxide materials.

17. The method of claim 1 wherein the gases generated in the cell feed alternate energy generating sources and processes.

18. The method of claim 1 wherein the catholyte compartment of the cell is purged with one or more inert or nonflammable gases.

19. The method of claim 1 wherein the ceramic membrane comprises a ceramic material having the formula $NaM_2(BO_4)_3$ where $M^2$ is Na, Li, or K; and B is selected from elements having a valence of 2+, 3+, 4+, or 5+.

20. The method of claim 1 wherein the ceramic membrane comprises a ceramic material having the formula $M_{1+x}A_{2-x}N_yB_xC_{3-x}O_{12}$ where $0<x<2$; $0<y<2$; $M^1$, $M^2$ are independently selected from Na, Li, and K; and A, N, B and C are independently selected from elements having a valence of 2+, 3+, 4+, or 5+.

21. The method of claim 1 wherein the ceramic membrane comprises a ceramic material having the formula $M_{1+x}A_{2-x}N_yB_xC_{3-x}O_{12}$ where $0<x<2$; $0<y<2$; $M^1$, $M^2$, A, N, B and C are independently selected from elements having a valence of 2+, 3+, 4+, or 5+.

22. The method of claim 1 wherein the ceramic membrane comprises a ceramic material having the formula $Na_3Zr_2Si_2PO_{12}$.

23. The method of claim 1 wherein the ceramic membrane comprises a ceramic material having the formula $Na_5RESi_4O_{12}$ where RE is Yttrium or a rare earth element.

24. The method of claim 1 wherein the anolyte has a pH of 1 to 14.

25. The method of claim 1, wherein the anolyte compartment is maintained at a temperature below about 65° C. during sodium salt electrolysis.

26. The method of claim 1, wherein the anolyte compartment is maintained at a temperature below about 50° C. during sodium salt electrolysis.

27. A method for producing sodium methylate solution, the method comprising:
    feeding a catholyte solution comprising methanol or a dilute solution of sodium methoxide in methanol into a catholyte compartment of an electrolytic cell;
    feeding an anolyte solution comprising an aqueous solution of one or more sodium salts into an anolyte compartment of the cell; and
    applying an electric voltage to the cell sufficient to electrolyze the one or more sodium salts,
    wherein the anolyte compartment and the catholyte compartment are separated by a ceramic membrane comprising a NaSICON type or modified NaSICON type material that, upon flow of the electric current, selectively transports sodium cations from the anolyte compartment to the catholyte compartment, and is substantially impermeable to water, and is substantially impermeable to methanol and a dilute solution of sodium methoxide, wherein the ceramic membrane operates at a current density of at least about 100 mA/cm$^2$; whereby sodium methylate solution is formed in the catholyte compartment of the cell and has a concentration of about 1% to about 32% by weight; and wherein the anolyte compartment is maintained at a temperature below about 65° C. during sodium salt electrolysis.

28. The method according to claim 27, wherein the sodium methylate solution formed has a concentration of at least 5% by weight.

29. The method of claim 27, wherein the anolyte compartment is maintained at a temperature below about 50° C. during sodium salt electrolysis.

* * * * *